(12) United States Patent
Kobayashi

(10) Patent No.: US 8,161,642 B2
(45) Date of Patent: Apr. 24, 2012

(54) HOLDING APPARATUS AND METHOD FOR MANUFACTURING HONEYCOMB STRUCTURE

(75) Inventor: Hiroyuki Kobayashi, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 1095 days.

(21) Appl. No.: 11/925,374

(22) Filed: Oct. 26, 2007

(65) Prior Publication Data

US 2008/0088072 A1    Apr. 17, 2008

Related U.S. Application Data

(63) Continuation of application No. PCT/JP2006/310922, filed on May 31, 2006.

(51) Int. Cl.
*B21D 51/16* (2006.01)
*B23Q 3/00* (2006.01)
*B23Q 7/00* (2006.01)
*B28B 1/00* (2006.01)

(52) U.S. Cl. ......... 29/890; 29/559; 264/630; 269/287; 269/289 MR

(58) Field of Classification Search ......... 29/890, 29/559, 283, 264; 264/630; 269/9, 55, 152, 269/289 MR, 270, 287, 309, 909
See application file for complete search history.

(56) References Cited

U.S. PATENT DOCUMENTS

| | | | |
|---|---|---|---|
| 2,107,051 A * | 2/1938 | Briney | 451/242 |
| 2,557,202 A * | 6/1951 | Gwynne et al. | 269/201 |
| 3,174,650 A * | 3/1965 | Bellato | 81/3.33 |
| 3,848,863 A * | 11/1974 | Owen | 269/9 |
| 5,106,295 A | 4/1992 | Misawa | |
| 5,556,326 A * | 9/1996 | Rouyer et al. | 451/246 |
| 5,914,187 A | 6/1999 | Naruse et al. | |
| 6,669,751 B1 | 12/2003 | Ohno et al. | |
| 7,112,233 B2 | 9/2006 | Ohno et al. | |
| 7,309,370 B2 | 12/2007 | Kudo et al. | |
| 7,332,014 B2 | 2/2008 | Ono et al. | |
| 7,341,614 B2 | 3/2008 | Hayashi et al. | |

(Continued)

FOREIGN PATENT DOCUMENTS

DE    19632124    2/1998

(Continued)

OTHER PUBLICATIONS

Japanese Office Action for corresponding JP Application No. 2007-125933, Nov. 8, 2011.

*Primary Examiner* — Alexander P Taousakis
(74) *Attorney, Agent, or Firm* — Ditthavong Mori & Steiner, P.C.

(57) ABSTRACT

A holding apparatus includes a first holding unit including at least two supporting rollers rotatable around rotation shafts which extend substantially parallel with each other; a second holding unit including at least one supporting roller rotatable around a rotation shaft; and at least one holding mechanism having the first holding unit and the second holding unit. The rotation shafts of the supporting rollers of the first holding unit and the rotation shaft of the supporting roller of the second holding unit are substantially in parallel with each other. By moving at least one of the first holding unit and the second holding unit, an object to be held is held between the first holding unit and the second holding unit by using the supporting rollers.

10 Claims, 10 Drawing Sheets

Fig. 1(a)

U.S. PATENT DOCUMENTS

| | | |
|---|---|---|
| 7,348,049 B2 | 3/2008 | Yoshida |
| 7,387,829 B2 | 6/2008 | Ohno et al. |
| 7,393,376 B2 | 7/2008 | Taoka et al. |
| 7,396,586 B2 | 7/2008 | Ohno et al. |
| 7,427,308 B2 | 9/2008 | Taoka et al. |
| 7,427,309 B2 | 9/2008 | Ohno et al. |
| 7,438,967 B2 | 10/2008 | Fujita |
| 7,449,427 B2 | 11/2008 | Ohno et al. |
| 7,462,216 B2 | 12/2008 | Kunieda et al. |
| 7,473,465 B2 | 1/2009 | Ohno et al. |
| 2003/0090038 A1 | 5/2003 | Ishikawa et al. |
| 2004/0131772 A1* | 7/2004 | Yamada et al. ............... 427/230 |
| 2004/0161596 A1 | 8/2004 | Taoka et al. |
| 2005/0109023 A1 | 5/2005 | Kudo et al. |
| 2005/0153099 A1 | 7/2005 | Yamada |
| 2005/0169819 A1 | 8/2005 | Shibata |
| 2005/0175514 A1 | 8/2005 | Ohno |
| 2005/0180898 A1 | 8/2005 | Yamada |
| 2005/0247038 A1 | 11/2005 | Takahashi |
| 2005/0266992 A1 | 12/2005 | Ohno et al. |
| 2005/0272602 A1 | 12/2005 | Ninomiya |
| 2006/0029897 A1 | 2/2006 | Saijo et al. |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0166820 A1 | 7/2006 | Ogyu et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0245465 A1 | 11/2006 | Saijo et al. |
| 2006/0269722 A1 | 11/2006 | Yamada |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0169453 A1 | 7/2007 | Hayakawa |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0202455 A1 | 8/2007 | Saijo et al. |
| 2007/0204580 A1 | 9/2007 | Kunieda |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0106008 A1 | 5/2008 | Kasai et al. |
| 2008/0106009 A1 | 5/2008 | Naruse et al. |
| 2008/0116200 A1 | 5/2008 | Kawai et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0157445 A1 | 7/2008 | Kawai et al. |
| 2008/0174039 A1 | 7/2008 | Saijo et al. |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 1177994 | 2/2002 |
| FR | 2843333 | 2/2004 |
| JP | 57-160806 | 10/1982 |
| JP | 60-20885 | 2/1985 |
| JP | 1-271192 | 10/1989 |
| JP | 3-26485 | 2/1991 |
| JP | 4-35894 U | 3/1992 |
| JP | 6-170658 | 6/1994 |
| JP | 2000-203799 | 7/2000 |
| JP | 2003-020099 | 1/2003 |
| JP | 2005-349378 | 12/2005 |

* cited by examiner

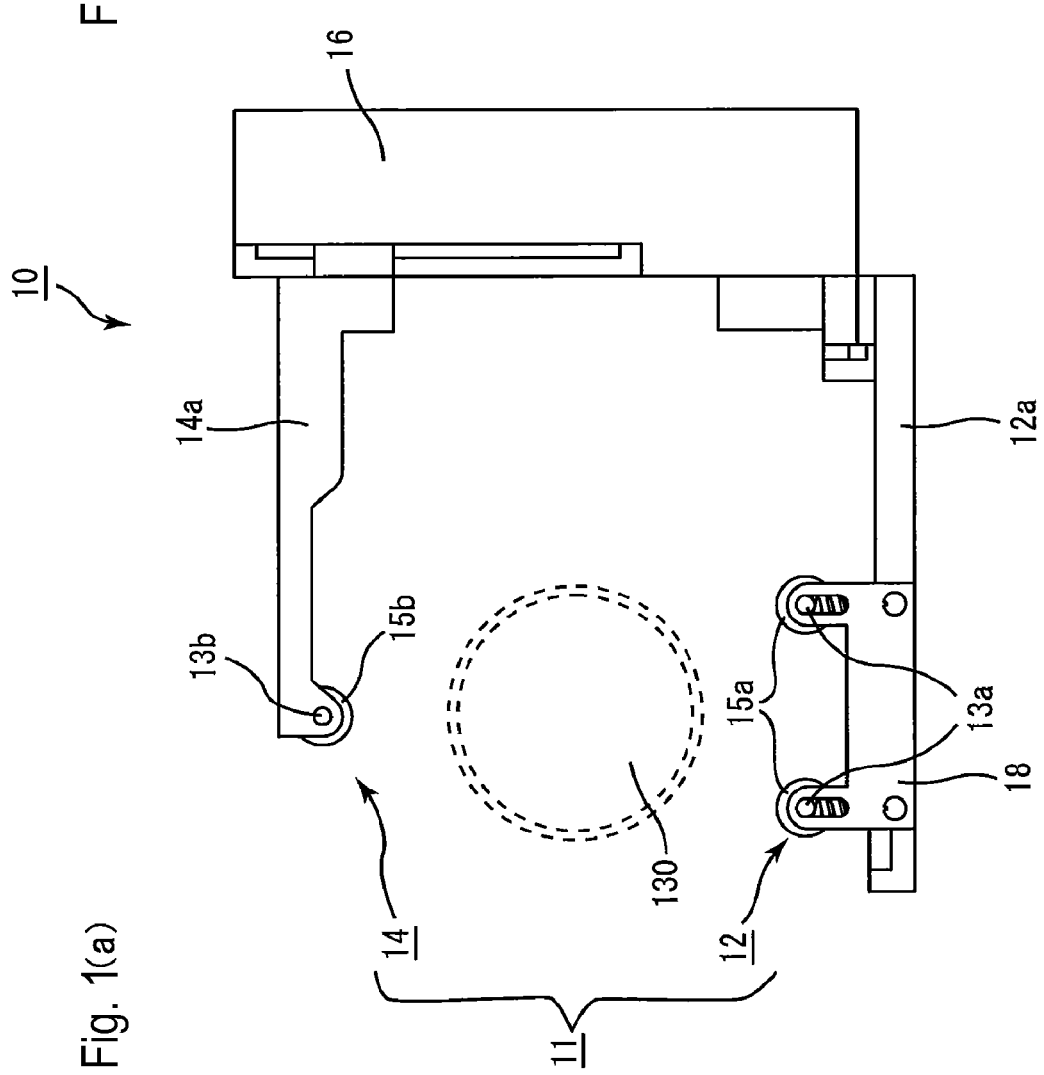
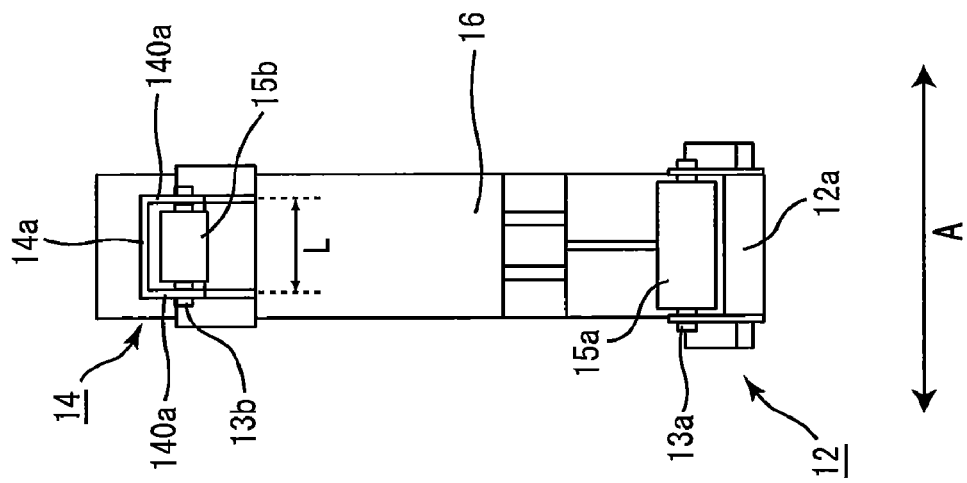
Fig. 1(a)
Fig. 1(b)

X—X line cross-sectional view

HOLDING APPARATUS AND METHOD FOR MANUFACTURING HONEYCOMB STRUCTURE

CROSS-REFERENCE TO RELATED APPLICATIONS

This application is a continuation application of PCT/JP2006/310922 filed on May 31, 2006, entitled "HOLDING APPARATUS AND METHOD FOR MANUFACTURING HONEYCOMB STRUCTURE." The contents of this application are incorporated herein by reference in its entirety.

BACKGROUND OF THE INVENTION

1. Field of the Invention

The present invention relates to a holding apparatus and a method for manufacturing a honeycomb structure.

2. Discussion of the Background

In recent years, particulates, such as soot, contained in exhaust gases discharged from internal combustion engines of vehicles, such as buses and trucks, construction machines and the like, have become serious problems as contaminants harmful to the environment and the human body.

For this reason, various honeycomb filters, which use honeycomb structures including porous ceramic materials, have been proposed as filters that capture particulates in exhaust gases to purify the exhaust gases.

Conventionally, upon manufacturing the honeycomb structure, for example, first, a wet mixture is prepared by mixing a ceramic powder, a binder, a dispersant solution, and the like. Moreover, the wet mixture is continuously extrusion-molded through a die, and the extrusion-molded body is cut into a predetermined length so that a rectangular pillar-shaped honeycomb molded body is manufactured.

Next, the attained honeycomb molded body is dried, and predetermined cells are sealed so that either one of the ends of the cell is sealed.

The sealed honeycomb molded body is carried into a degreasing furnace, and a degreasing process is carried out thereto.

Next, the degreased honeycomb molded body is carried into a firing furnace, and a firing process is carried out thereto, and then cooled to manufacture a honeycomb fired body.

Thereafter, a sealing material paste is applied to the side faces of the honeycomb fired body, and by bonding the honeycomb fired bodies to one another, an aggregated body of the honeycomb fired bodies in which a number of honeycomb fired bodies are combined with one another by interposing sealing material layers (adhesive layers) is manufactured. Next, the attained aggregated body of the honeycomb fired bodies is cut into a predetermined shape such as a cylindrical shape and a cylindroid shape by using a cutting machine and the like so that a ceramic block is formed, and lastly, a sealing material paste is applied to the outer periphery of the ceramic block to form a sealing material layer (coat layer); thus, the manufacturing processes of a honeycomb structure are completed.

Conventionally, in order to transport the honeycomb structure manufactured as mentioned above, a holding tool such as a clamp having a cushioning material has been used. In the case of transporting the honeycomb structure by using such a holding tool, the holding process is carried out on the honeycomb structure with a tilted orientation, the honeycomb structure in the tilted orientation is held as it is, and the held honeycomb structure might fall in the middle of the transportation. Moreover, even in the case where the falling in the middle of the transportation is avoided, since the honeycomb structure is held in the tilted orientation, a corner portion or the like located near the border between an end face and a side face of the honeycomb structure is first brought into contact with a mount face, upon placing it at a predetermined position after the transporting process, to cause chippings and cracks on the corner portion or the like.

Here, in a device such as a line-type cap seamer used for automatically winding and tightening a cap onto an opening portion of a bottle container, as the container holding device used for carrying out rotation-stopping and centering operations on the bottle container, a container holding device in which a pair of supporting rollers of grippers placed on both of the sides of a container transporting path being used for pinching and supporting the container from both of the sides has been disclosed, for example, in Japanese Unexamined Patent Application Publication No. 2003-20099.

In the above-mentioned container holding device, even in the case where the outer diameter dimension of the container is slightly changed, the rotation-stopping and centering operations can be carried out; however, since the paired grippers are simply driven at one time toward the container located on the line to pinch it from both of the sides, it is difficult to correct the orientation to an appropriate orientation when it is held, although the container can be fixed at that position.

Consequently, even in the case where an attempt is made to apply the above-mentioned container holding device to the holding process of the honeycomb structure, the application thereof is very difficult since an appropriate orientation is required in the holding process as mentioned above.

Therefore, there have been strong demands for the developments of a holding apparatus which is used in manufacturing processes of a honeycomb structure, and can naturally correct the orientation in the held state so that the honeycomb structure is held in its appropriate orientation, even in the case where the honeycomb structure is held with a tilted orientation. The contents of Japanese Unexamined Patent Application Publication No. 2003-20099 are incorporated herein by reference in their entirety.

SUMMARY OF THE INVENTION

The holding apparatus of the present invention includes a first holding unit including at least two supporting rollers rotatable around rotation shafts which extend substantially parallel with each other; a second holding unit including at least one supporting roller rotatable around a rotation shaft; and at least one holding mechanism having the above-mentioned first holding unit and the above-mentioned second holding unit. The rotation shafts of the supporting rollers of the above-mentioned first holding unit and the rotation shaft of the supporting roller of the above-mentioned second holding unit are substantially in parallel with each other. By moving at least one of the above-mentioned first holding unit and the above-mentioned second holding unit, an object is configured to be held between the above-mentioned first holding unit and the above-mentioned second holding unit by using the supporting rollers.

The holding apparatus of the present invention further includes a first supporting arm to which the above-mentioned first holding unit is attached; and a second supporting arm to which the above-mentioned second holding unit is attached. At least one of the first supporting arm and the second supporting arm is preferably moved to hold the object.

In the holding apparatus of the present invention, at least one of the above-mentioned first holding unit and the above-mentioned second holding unit preferably has a coupling member that can expand and shrink, with the supporting roller of the above-mentioned at least one of the holding units being coupled to the above-mentioned coupling member through the rotation shaft thereof.

The holding apparatus of the present invention preferably further includes a rotation stopping member that is made in contact with the above-mentioned rotation shaft or the above-mentioned supporting roller to stop the rotation of the above-mentioned supporting roller, in the case where the above-mentioned coupling member is shrunk by a predetermined distance.

In the holding apparatus of the present invention, an elastic layer including an elastic material is preferably formed on the surface of the above-mentioned supporting roller.

In the holding apparatus of the present invention, the above-mentioned object to be held preferably has a pillar shape.

The holding apparatus of the present invention is used for a transporting process in manufacturing processes of a honeycomb structure. The manufacturing process includes molding a ceramic material to form a pillar-shaped honeycomb molded body in which a number of cells are disposed substantially in parallel with one another in a longitudinal direction with a cell wall therebetween, and firing the honeycomb molded body to obtain a honeycomb fired body as the honeycomb structure. The above-mentioned transporting process is preferably at least one of transporting the honeycomb molded body, transporting the honeycomb fired body, and transporting the honeycomb structure.

In the holding apparatus, the first holding unit preferably has the coupling member, and the second holding unit has a cut-out portion.

In the holding apparatus, the rotation stopping member is preferably at least one of a block member including an elastic material, and a block member including resin with an increased frictional resistance on the surface.

In the holding apparatus, the elastic material is preferably at least one of synthetic rubber, natural rubber, silicon resin, urethane resin, epoxy resin, and propylene resin.

The holding apparatus preferably further includes at least one additional set of the first holding unit and the second holding unit on the first supporting arm and the second supporting arm, the adjacent supporting rollers being provided in substantially parallel with each other.

The holding apparatus preferably further includes an additional holding unit and an additional supporting roller which are provided at the first or second supporting arm; a third supporting arm having a third holding unit which includes a supporting roller facing the additional supporting roller and being provided in substantially parallel with the additional supporting roller; and an additional holding mechanism having the additional holding unit and the third holding unit, an additional object is configured to be held between the supporting rollers of the additional holding unit and the third holding unit.

The holding apparatus is preferably coupled to a moving robot arm.

The method for manufacturing a honeycomb structure of the present invention includes molding a ceramic material to form a pillar-shaped honeycomb molded body in which a number of cells are disposed substantially in parallel with one another in a longitudinal direction with a cell wall therebetween, firing the honeycomb molded body to obtain a honeycomb fired body as the honeycomb structure, providing a holding apparatus including a first holding unit including at least two supporting rollers rotatable around rotation shafts which extend substantially parallel with each other, a second holding unit including at least one supporting roller rotatable around a rotation shaft, and at least one holding mechanism having the first holding unit and the second holding unit. The rotation shafts of the supporting rollers of the first holding unit and the rotation shaft of the supporting roller of the second holding unit are substantially in parallel with each other. By moving at least one of the first holding unit and the second holding unit, an object is configured to be held between the first holding unit and the second holding unit by using the supporting rollers. The method further includes using the holding apparatus to hold and transport as the object at least one of the honeycomb molded body, the honeycomb fired body, and the honeycomb structure in the manufacturing process.

In the method for manufacturing a honeycomb structure of the present invention, the above-mentioned holding apparatus further includes a first supporting arm to which the above-mentioned first holding unit is attached and a second supporting arm to which the above-mentioned second holding unit is attached. One of the first supporting arm and the second supporting arm is preferably moved to hold the object.

In the method for manufacturing a honeycomb structure of the present invention, at least one of the above-mentioned first holding unit and the above-mentioned second holding unit preferably has a coupling member that can expand and shrink, with the supporting roller of the above-mentioned at least one of the holding units being coupled to the above-mentioned coupling member through the rotation shaft thereof.

In the method for manufacturing a honeycomb structure of the present invention, the above-mentioned holding apparatus preferably includes a rotation stopping member that is made in contact with the above-mentioned rotation shaft or the above-mentioned supporting roller to stop the rotation of the above-mentioned supporting roller, in the case where the above-mentioned coupling member is shrunk by a predetermined distance.

In the method for manufacturing a honeycomb structure of the present invention, an elastic layer including an elastic material is preferably formed on the surface of the above-mentioned supporting roller.

In the method for manufacturing a honeycomb structure of the present invention, the above-mentioned transporting process is the above-mentioned honeycomb structure transporting process, and the above-mentioned honeycomb structure preferably has a shape of a cylindrical shape, a cylindroid shape, or a pillar shape with a racetrack end face.

The first holding unit which is preferably used in the method for manufacturing a honeycomb structure has the coupling member, and the second holding unit which is preferably used in the method for manufacturing a honeycomb structure has a cut-out portion.

The rotation stopping member which is preferably used in the method for manufacturing a honeycomb structure is at least one of a block member including an elastic material, and a block member including resin with an increased frictional resistance on the surface.

The elastic material which is preferably used in the method for manufacturing a honeycomb structure is at least one of synthetic rubber, natural rubber, silicon resin, urethane resin, epoxy resin, and propylene resin.

The holding apparatus which is preferably used in the method for manufacturing a honeycomb structure further includes at least one additional set of the first holding unit and the second holding unit on the first supporting arm and the second supporting arm, the adjacent supporting rollers being provided in substantially parallel with each other.

The holding apparatus which is preferably used in the method for manufacturing a honeycomb structure further includes an additional holding unit and an additional supporting roller which are provided at the first or second supporting arm; a third supporting arm having a third holding unit which includes a supporting roller facing the additional supporting roller and being provided in substantially parallel with the additional supporting roller; and an additional holding mechanism having the additional holding unit and the third holding unit, an additional object is configured to be held between the supporting rollers of the additional holding unit and the third holding unit.

The holding apparatus which is preferably used in the method for manufacturing a honeycomb structure is coupled to a moving robot arm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1(a) is a side view that shows one example of an embodiment of a holding apparatus of the present invention, and FIG. 1(b) is a front view of the embodiment of the holding apparatus of the present invention shown in FIG. 1(a).

DESCRIPTION OF THE EMBODIMENTS

Figure 2:
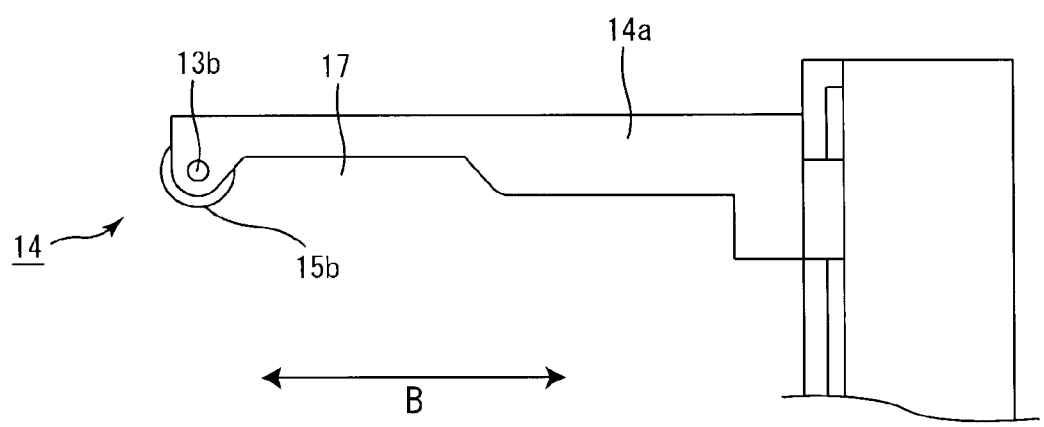
FIG. 2 is an enlarged side view that shows a second holding unit shown in FIG. 1(a) in an enlarged manner.

The embodiments will now be described with reference to the accompanying drawings, wherein like reference numerals designate corresponding or identical elements throughout the various drawings.

First, the following will describe a holding apparatus according to the embodiment of the present invention with reference to figures.

The holding apparatus according to the embodiment of the present invention includes a first holding unit including at least two supporting rollers rotatable around rotation shafts which extend substantially parallel with each other; a second holding unit including at least one supporting roller rotatable around a rotation shaft; and at least one holding mechanism having the above-mentioned first holding unit and the above-mentioned second holding unit. The rotation shafts of the supporting rollers of the above-mentioned first holding unit and the rotation shaft of the supporting roller of the above-mentioned second holding unit are substantially in parallel with each other. By moving at least one of the above-mentioned first holding unit and the above-mentioned second holding unit, an object to be held is held between the above-mentioned first holding unit and the above-mentioned second holding unit by using the above-mentioned supporting rollers.

In the holding apparatus according to the embodiment of the present invention, by holding an object to be held by using supporting rollers included in the first holding unit and the second holding unit, the orientation of the object to be held can be naturally corrected upon holding the object. With this arrangement, it becomes possible to effectively prevent the object to be held from falling down, and also to prevent a corner portion or the like of the object to be held from bringing into contact with the mounting face to cause chipping or the like, upon placing the object to be held.

The holding apparatus according to the embodiment of the present invention is suitably used as a holding apparatus for holding a honeycomb structure and constituent members thereof or the like, including a brittle material, in each of the transporting processes of the manufacturing processes of a honeycomb structure.

In the holding apparatus according to the embodiment of the present invention, the object to be held, which is the target to be held, is not particularly limited, and various objects to be held can be used as the targets to be held. The following will describe a honeycomb structure including a ceramic material and should be carefully handled because of its brittle material, as one example of the object to be held.

Figure 3A:
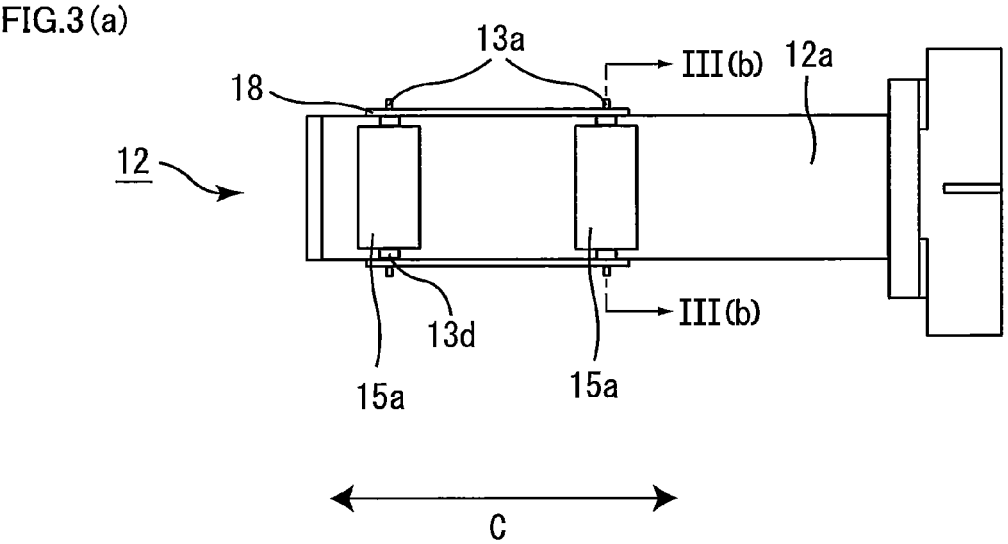
FIG. 3(a) is an enlarged top view that shows a first holding unit shown in FIG. 1(a) in an enlarged manner.

FIG. 1(a) is a side view that shows one example of an embodiment of the holding apparatus of the present invention, and FIG. 1(b) is a front view of the embodiment of the holding apparatus of the present invention shown in FIG. 1(a). Also, FIG. 2 is an enlarged side view that shows a second holding unit shown in FIG. 1(a) in an enlarged manner, and FIG. 3(a) is an enlarged top view that shows a first holding unit shown in FIG. 1(a) in an enlarged manner.

As shown in FIG. 1(a), a holding apparatus 10 is formed by a supporting arm 12a (a first supporting arm) to which a first holding unit 12 is attached, a supporting arm 14a (a second supporting arm) to which a second holding unit 14 is attached (hereinafter, the first holding unit and/or the second holding unit are sometimes referred to simply as holding units) and a base portion 16 that supports the supporting arm 12a and the supporting arm 14a. The supporting arm 12a and the supporting arm 14a are respectively supported perpendicularly to the base portion 16, and the supporting arm 12*a* and the supporting arm 14*a* are disposed in parallel with each other.

Here, in the present specification, the base portion refers to a member which is not allowed to move toward the object to be held, even in the case where the holding apparatus holds an object to be held or releases the held object.

Here, with respect to the honeycomb structure 130 indicated by a broken line in FIG. 1(*a*), the description thereof will be given later in the description of the holding operation of the holding apparatus. Also, in FIG. 1(*b*), the honeycomb structure 130 indicated by the broken line in FIG. 1(*a*) is omitted for convenience of description.

One end of the supporting arm 12*a* to which the first holding unit 12 is attached is fixed to the lower portion of the base portion 16. On the other hand, one end of the supporting arm 14*a* to which the second holding unit 14 is attached is connected to a driving mechanism such as an air cylinder or a ball screw disposed inside the base portion 16, and supported in a manner so as to move while being maintained in parallel with the first holding unit 12. By using the driving mechanism connected to the supporting arm 14*a* attached with the second holding unit 14, the distance between the first holding unit 12 and the second holding unit 14 can be appropriately adjusted in accordance with the size of an object to be held.

As shown in FIGS. 1(*a*) and 1(*b*) and FIG. 3(*a*), the first holding unit 12 is attached to a single supporting arm 12*a* supported on the lower portion of the base portion 16. The supporting arm 12*a* includes a rectangular pillar-shaped plate member, and two supporting rollers 15*a* are attached to the supporting arm 12*a* in such a manner that the rotation shafts 13*a* are made in parallel with each other, and also attached to face the second holding unit 14. The width of the supporting arm 12*a* in the direction shown by a double-headed arrow A in FIG. 1(*b*) is made larger than a distance L between bent portions 140*a* in the second holding unit 14 shown in FIG. 1(*b*). As shown in FIG. 3(*a*), the first holding unit 12 includes two supporting rollers 15*a* with rotation shafts 13*a* being made in parallel with each other, and the respective supporting rollers 15*a* are allowed to rotate independently. Also, the width in the rotation shaft direction of each supporting roller 15*a* (the direction shown by a double-headed arrow A in FIG. 1(*b*)) is made slightly smaller than the width of the supporting arm 12*a*.

A coupling member 18 is attached to the supporting arm 12*a* so as to support the rotation shafts 13*a* of the supporting rollers 15*a*. The rotation shafts 13*a* of the supporting rollers 15*a* attached to the supporting arm 12*a* through the coupling member 18 are made orthogonal to the longitudinal direction (the direction shown by a double-headed arrow C in FIG. 3(*a*)) of the supporting arm 12*a* as shown in FIG. 3(*a*), and are supported above from the upper face of the supporting arm 12*a*, that is, the opposite face to the second holding unit 14, with a predetermined gap. Since the rotation shafts 13*a* of the supporting rollers 15*a* are attached above from the upper face of the supporting arm 12*a* by the coupling member 18 with the predetermined gap, so that even in the case where there are irregularities or the like on the outer shape of the object to be held, the supporting rollers 15*a* are made in contact with the object along the irregularities or the like; thus, the object to be held can be firmly held.

On the other hand, as shown in FIG. 2, the second holding unit 14 is attached to the single supporting arm 14*a*, and the supporting arm 14*a* has a shape that a narrow plate is provided with two creases in parallel with each other in the longitudinal direction and divided into three portions, and then the two end portions of the three are bent perpendicularly to the center portion so as to face each other.

The second holding unit 14 includes one supporting roller 15*b*, and as shown in FIGS. 1(*b*) and 2, the supporting roller 15*b* is supported in a manner so as to pass through the two bent portions 140*a* of the supporting arm 14*a* that are bent and made in parallel with each other. The supporting roller 15*b* has a rotation shaft 13*b* that is parallel to the rotation shaft 13*a* of the supporting roller 15*a* attached to the first holding unit 12, and is attached to the supporting arm 14*a* so as to face the supporting roller 15*a*. Since the rotation shaft 13*b* of the supporting roller 15*b* is also made in parallel with the rotation shaft 13*a* of the supporting roller 15*a* attached to the supporting arm 12*a*, it is made orthogonal to the longitudinal direction (the direction shown by a double-headed arrow B in FIG. 2) of the supporting arm 14*a* to which the second holding unit 14 is attached. Also, the width in the rotation shaft direction (the direction shown by a double-headed arrow A in FIG. 1(*b*)) of the supporting roller 15*b* attached to the supporting arm 14*a* is made slightly smaller than the width in the direction orthogonal to the longitudinal direction of the supporting arm 14*a*.

A cut-out portion 17 is formed in each of the bent portions 140*a* adjacent to the supporting roller 15*b* (refer to FIG. 2). With this cut-out portion 17, even in the case where there are irregularities or the like in the outer shape of an object to be held, the supporting roller 15*b* can be made in contact with the object to be held along the outer shape of the object to be held, with the outer periphery of the object to be held being kept from contacting with the supporting arm 14*a*.

As mentioned above, the supporting rollers 15*a* and 15*b* are respectively attached to the supporting arm 12*a* and the supporting arm 14*a* so as to face each other. Also, the center between the rotation shafts of the two supporting rollers 15*a* and the center of the rotation shaft of the supporting roller 15*b* are located virtually on the same line as a line parallel to the moving direction of the second holding unit 14 (see FIG. 1(*a*)).

In this manner, a holding mechanism 11 is formed by the first holding unit 12 including the supporting roller 15*a* attached to the supporting arm 12*a* and the second holding unit 14 including the supporting roller 15*b* attached to the supporting arm 14*a*. Therefore, the holding apparatus 10, shown in FIG. 1(*a*), has one holding mechanism 11. As will be mentioned later, the single holding mechanism 11 is allowed to hold one object to be held.

A driving mechanism, disposed inside the base portion 16, is formed by an air cylinder, a ball screw that is capable of moving the second holding unit 14 toward the first holding unit 12, as mentioned above and the like. Also, a pressure sensor (not shown), which can recognize that a pressure is loaded on the second holding unit 14 and measure the pressure, may be disposed inside the base portion 16 in addition to the above-mentioned driving mechanism, and in the case where a ball screw is used as the above-mentioned driving mechanism, the pressure sensor is preferably disposed. This is because, upon holding an object to be held between the first holding unit 12 and the second holding unit 14, the pressure to be loaded on the second holding unit 14 can be measured by the pressure sensor, and thus it becomes possible to hold the object to be held at an appropriate pressure.

Figure 11:
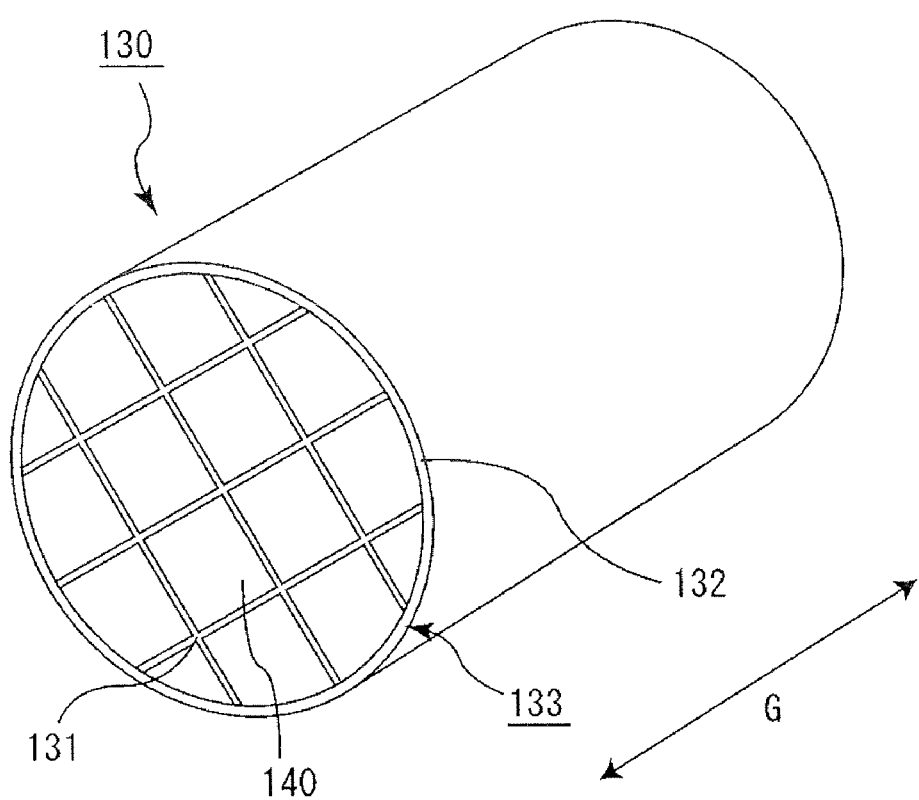
FIG. 11 is a perspective view that schematically shows one example of a honeycomb structure.

The following will describe operations of the holding apparatus according to the embodiment of the present invention in the case where a honeycomb structure, as shown in FIG. 11, is held as an object to be held. Here, the operations in which the holding apparatus 10 having the structure shown in FIGS. 1(*a*), 1(*b*), 2 and 3(*a*)-(*c*) is used to hold an object to be held are described.

In the holding apparatus 10, by moving the second holding unit 14 toward the first holding unit 12, one object to be held is held between the first holding unit 12 and the second holding unit 14 by using the supporting rollers 15a and 15b.

The holding apparatus 10 shown in FIG. 1(a) is allowed to approach a honeycomb structure 130 placed on a predetermined mount face, mount base or the like from the side face side, so as to hold the side face of the honeycomb structure 130. In the case where the holding apparatus 10 has come closer so that the honeycomb structure 130 is located between the supporting rollers 15a and 15b, the approaching operation to the honeycomb structure 130 is stopped, and a holding operation is then started.

First, the first holding unit 12 attached to the supporting arm 12a is allowed to approach the side face of the honeycomb structure so that the supporting roller 15a is made in contact with the side face of the honeycomb structure. At this time, since the supporting roller 15a is supported above by the coupling member 18 with a predetermined distance from the upper face of the supporting arm 12a, even in the case where the honeycomb structure 130 has a cylindrical outer shape with its side face formed into a curved face, it is surely made in contact therewith along the side face.

Next, by driving the driving mechanism inside the base portion 16, the second holding unit 14 attached to the supporting arm 14a is moved so as to approach the first holding unit 12. At the time when the supporting roller 15b is made in contact with the side face of the honeycomb structure 130, the pressure sensor disposed in the base portion 16 detects a change in the pressure to be loaded on the second holding unit 14, and at the time when the pressure to be loaded to the second holding unit 14 by the succeeding move of the second holding unit 14 has been raised to a predetermined pressure (that is, a pressure capable of sufficiently preventing a fall of the honeycomb structure in the case where it is held to be transported), the moving operation of the second holding unit 14 toward the first holding unit 12 is stopped.

In the holding apparatus 10, even in the case where the honeycomb structure 130 is held in a state where the longitudinal direction of the honeycomb structure 130 is not in parallel with the rotation shafts 13a and 13b of the supporting rollers 15a and 15b in holding the honeycomb structure 130, since the supporting rollers 15a and 15b are respectively allowed to rotate independently, the orientation of the honeycomb structure 130 in the longitudinal direction is naturally corrected to an orientation in parallel with the rotation shafts 13a and 13b of the supporting rollers 15a and 15b. In this manner, in the holding apparatus 10, one honeycomb structure 130 can be surely held between the first holding unit 12 and the second holding unit 14 by using the supporting rollers 15a and 15b.

Also, since it is not necessary to precisely adjust the position of the holding apparatus 10 with respect to the honeycomb structure 130 at a stage prior to holding the honeycomb structure 130 so as to prepare an appropriate orientation of the honeycomb structure 130 after the holding process, the sequence of processes from the holding of the honeycomb structure 130 to the transporting and placing thereof on demand can be effectively improved in an efficient manner.

Figure 8A:
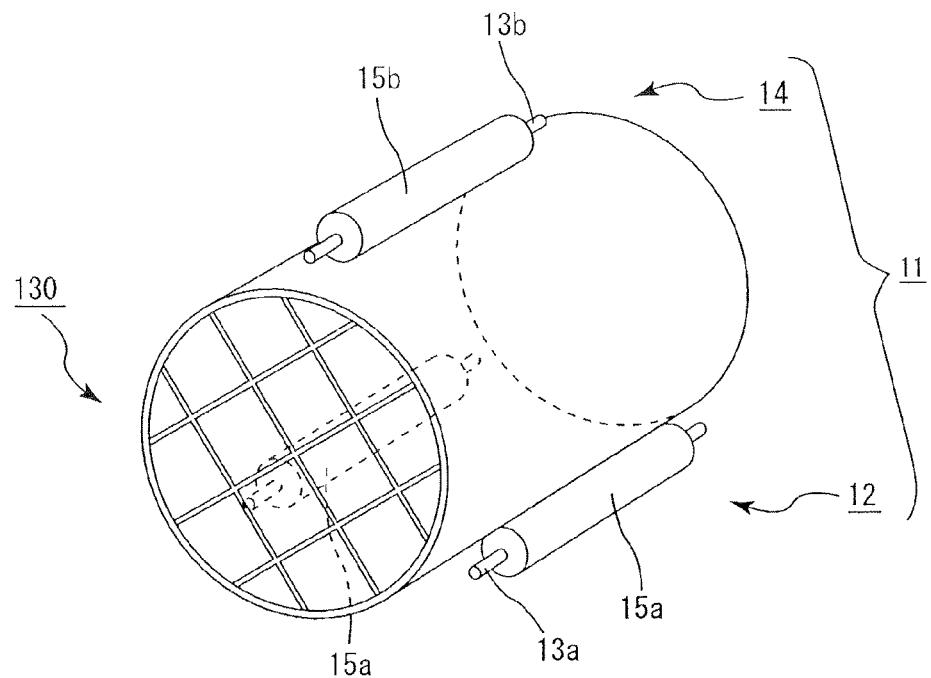
FIG. 8(a) is a perspective view that schematically shows a holding mechanism with a honeycomb structure being held therein.

Here, referring to FIG. 8(a), the following will describe the relationship between the honeycomb structure and the supporting rollers upon holding a honeycomb structure as an object to be held. FIG. 8(a) is a schematic view that shows a holding mechanism in a state where a honeycomb structure is held.

The holding mechanism 11 shown in FIG. 8(a), which has a structure corresponding to the structure of the holding mechanism shown in FIGS. 1(a) and (b), has a first holding unit 12 including two supporting rollers 15a and a second holding unit 14 including one supporting roller 15b. Here, in FIG. 8(a), for convenience of description, the supporting arms and the coupling members are omitted.

As shown in FIG. 8(a), the holding mechanism 11 has three supporting rollers, and holds the honeycomb structure 130 at one position on the upper side and two positions on the lower side, that is, at three positions altogether. After allowing the first holding unit 12 including the two supporting rollers 15a to be made in contact with the honeycomb structure 130, the second holding unit 14 including one supporting roller 15b is moved toward the honeycomb structure 130 so that the holding mechanism is set in a state as shown in FIG. 8(a). Here, even in the case where the longitudinal direction of the honeycomb structure 130 is not in parallel with the rotation shafts 13a and 13b of the supporting rollers 15a and 15b upon holding the honeycomb structure 130, since the three supporting rollers 15a and 15b are respectively allowed to rotate independently in holding, the orientation of the honeycomb structure 130 when held, can be corrected naturally.

The above-mentioned first holding unit and/or second holding unit are preferably attached to a plurality of supporting arms that are separated and disposed in parallel with one another.

In the holding apparatus 10 that has been described by reference to FIGS. 1(a), 1(b), 2 and 3(a)-(c), the first holding unit 12 and the second holding unit 14 are respectively attached to a single supporting arm 12a and a single supporting arm 14a. Not limited to this mode, in the holding apparatus according to the embodiment of the present invention, each of the first holding unit 12 and/or second holding unit 14 may be attached to a plurality of supporting arms. Referring to FIGS. 4(a), 4(b), 5 and 6, the following will describe an embodiment in which the first holding unit is attached to two supporting arms and the second holding unit is attached to a single supporting arm, as a variation of the holding apparatus 10.

Here, with respect to the honeycomb structure 130 indicated by a broken line in FIG. 4(a), the description thereof will be given later in the description of holding operations of the holding apparatus. Also, in FIG. 4(b), for convenience of description, the honeycomb structure 130, indicated by the broken line in FIG. 4(a), is omitted.

Figure 4B:
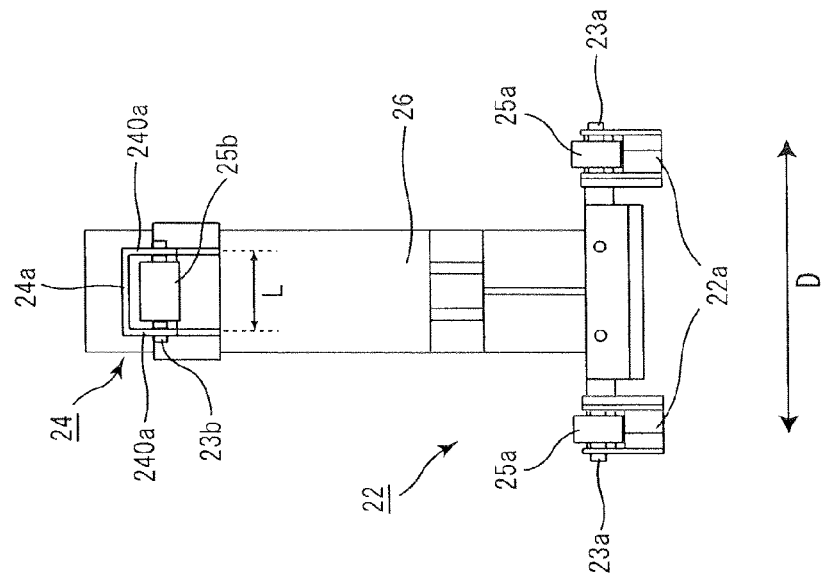
FIG. 4(b) is a front view that shows one example of another embodiment of the holding apparatus of the present invention shown in FIG. 4(a).
Figure 6:
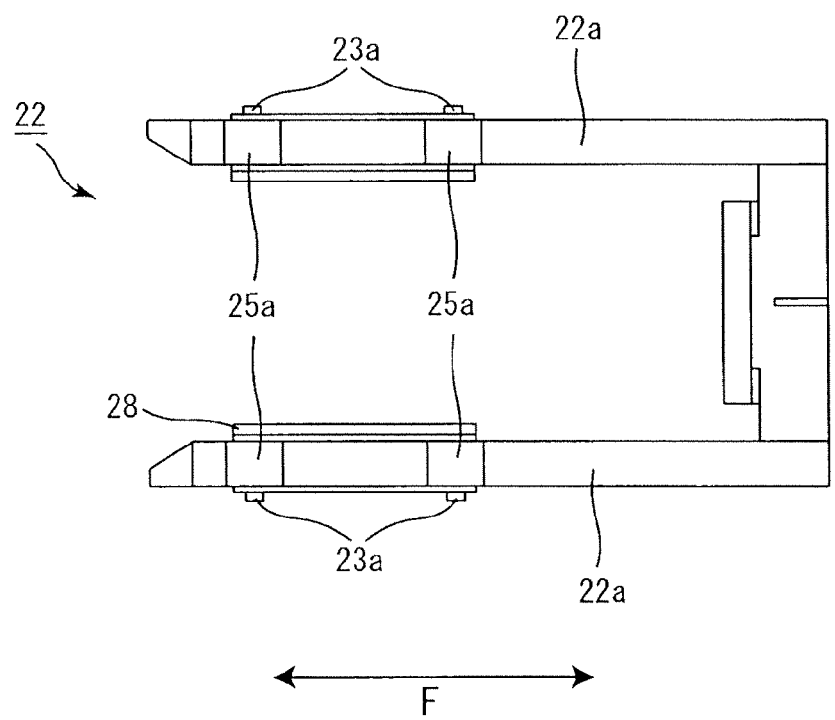
FIG. 6 is an enlarged top view that shows a first holding unit shown in FIG. 4(a) in an enlarged manner.

As shown in FIG. 4(b) and FIG. 6, the first holding unit 22 is attached to two supporting arms 22a that are separated and disposed in parallel with each other. Each of the supporting arms 22a includes a rod member having a rectangular pillar shape, and two supporting rollers 25a are attached to each supporting arm 22a with the same gap, with the respective rotation shafts 23a being made in parallel with each other, and also in a manner so as to face the second holding unit 24. The distance between the two supporting arms 22a is made larger than the distance L between the bent portions 240a in the second holding unit 24 shown in FIG. 4(b). As shown in FIG. 6, the first holding unit 22 includes a total of four supporting rollers 25a, with the respective rotation shafts 23a thereof being in parallel with one another, and the respective supporting rollers 25a are allowed to rotate independently. Also, the width in the rotation shaft direction of the supporting roller 25a (the direction shown by a double-headed arrow D in FIG. 4(b)) is made slightly smaller than the width of the supporting arm 22a.

Figure 4A:
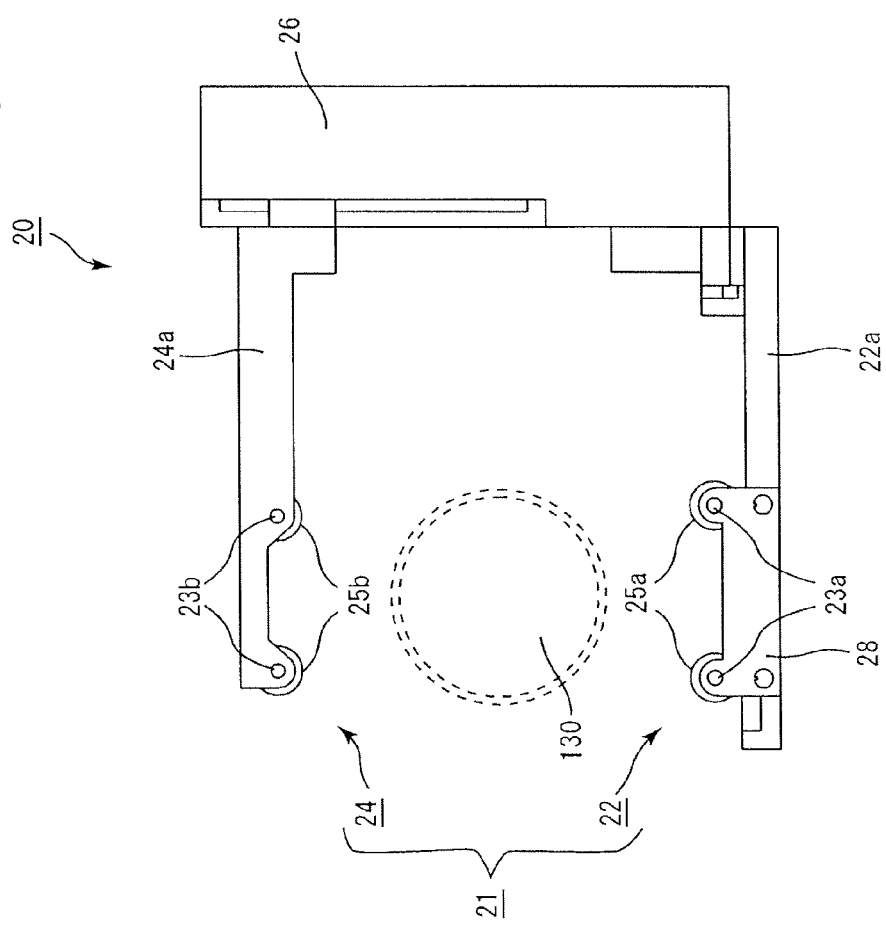
FIG. 4(a) is a side view that shows one example of another embodiment of the holding apparatus of the present invention.

The first holding unit 22 is coupled to the coupling member 28 through its rotation shaft 23a, and as shown in FIG. 4(a), the coupling member 28 is fixed to the respective two supporting arms 22a. All the rotation shafts 23a of the supporting rollers 25a coupled to the two supporting arms 22a by interposing the coupling member 28 are made orthogonal to the longitudinal direction (the direction shown by a double-headed arrow F in FIG. 6) of the supporting arms 22a as shown in FIG. 6, and supported above from the upper face of the supporting arms 22a, that is, from the face opposite to the second holding unit 24, with a predetermined gap. Since the rotation shafts 23a of the supporting rollers 25a are coupled to each other above from the upper face of the supporting arm 22a with a predetermined gap by interposing the coupling member 28, even in the case where there are irregularities and the like on the outer shape of an object to be held, the supporting rollers 25a are made in contact therewith along the irregularities and the like, thereby making it possible to surely hold the object to be held.

On the other hand, in the same manner as the second holding unit 14 that has been described by reference to FIGS. 1(a), (b) and 2, the second holding unit 24 is attached to a supporting arm 24a having a shape of a narrow plate with bents formed therein. The second holding unit 14 shown in FIGS. 1(a) and 1(b) has one supporting roller 15b; in contrast, a second holding unit 24 shown in FIGS. 4(a), 4(b) and 5 includes two supporting rollers 25b. The two supporting rollers 25b have rotation shafts 23b that are in parallel with the rotation shafts 23a of the supporting rollers 25a included in the first holding unit 22, and are coupled to the supporting arm 24a so as to face the supporting rollers 25a by interposing the coupling member 28. Since the rotation shafts 23b of the supporting rollers 25b are also in parallel with the rotation shafts 23a of the supporting rollers 25a attached to the supporting arms 22a, these are made orthogonal to the longitudinal direction (the direction shown by a double-headed arrow E in FIG. 5) of the supporting arm 24a forming the second holding unit 24. Also, the width in the rotation shaft direction of the supporting rollers 25b attached to the supporting arm 24a (the direction shown by a double-headed arrow D in FIG. 4(b)) are also made slightly smaller than the width of the supporting arm 24a in a direction orthogonal to the longitudinal direction.

Figure 5:
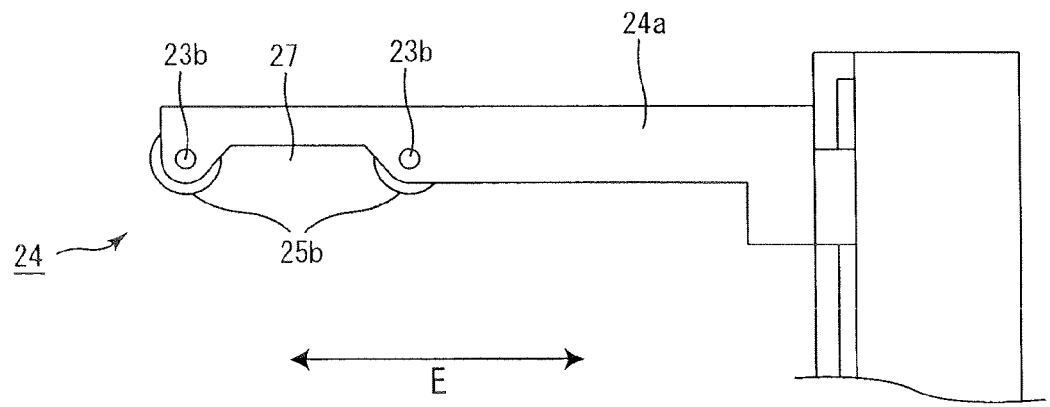
FIG. 5 is an enlarged side view that shows a second holding unit shown in FIG. 4(a) in an enlarged manner.

A cut-out portion 27 is formed in the bent portion 240a located between the two supporting rollers 25b (refer to FIG. 5). By this cut-out portion 27, even in the case where there are irregularities or the like on the outer shape of the object to be held, the supporting rollers 25b can be made in contact with the object to be held along the outer shape of the object to be held with the outer periphery of the object to be held being kept from contacting with the supporting arm 24a.

The supporting rollers 25a and 25b are respectively attached to the supporting arm 22a and the supporting arm 24a so as to face each other as mentioned above, and with respect to the installation gap between the respective supporting rollers 25a and 25b, the relationship is set in such a manner that the gap between the two supporting rollers 25a attached to the supporting arm 22a is larger than the gap between the two supporting rollers 25b attached to the supporting arm 24a. Also, in the case where the holding apparatus 20 shown in FIG. 4(a) is viewed as a projection view from the side face of the holding apparatus 20, the center between the two supporting rollers 25a attached to the same supporting arm and the center between the two supporting rollers 25b are located virtually on the same line as a line in parallel with the moving direction of the second holding unit 14. In this case, the gap between the two supporting rollers 25a attached to the same supporting arm and the gap between the two supporting rollers 25b may be the same, or may be different from each other.

In this manner, the holding mechanism 21 is formed by the first holding unit 22 including the supporting rollers 25a attached to the supporting arm 22a and the second holding unit 24 including the supporting rollers 25b attached to the supporting arm 24a. Therefore, the holding apparatus 20, shown in FIG. 4(a), is allowed to have one holding mechanism 21, and can hold a single object to be held.

In the embodiment of the holding apparatus described by reference to FIGS. 4(a), 4(b) and 6, the first holding unit 22 is attached to the two supporting arms 22a that are separated and disposed in parallel with each other; however, the mode of the first holding unit is not limited to that mode, and the first holding unit may be attached to three or more supporting arms. With respect to the second holding unit 24 as well, not limited to the above-mentioned mode, the second holding unit may be attached to two or more supporting arms. Here, since the stability upon holding an object to be held changes depending on the shape and the like of the object to be held, the first holding unit and/or the second holding unit are preferably attached to a plurality of supporting arms so as to flexibly deal with changes in the stability upon holding, caused by changes in the shape of the object to be held. In the holding apparatus according to the embodiment of the present invention, in order to stabilize its orientation at the time of holding an object to be held, the number of supporting points by the supporting arms may be preferably selected on demand in accordance with a change in the shape of the object to be held.

With respect to the shape of the supporting arms forming the first holding unit and the second holding unit, not limited to specific shapes as shown in FIGS. 1(a), 1(b), 2, 3(a)-(c), 4(a), 4(b), 5 and 6, various shapes can be adopted. For example, with respect to the shape of the second holding unit, not the above-mentioned shape in which the two ends of a narrow plate in the longitudinal direction are valley-bent, but a rod member having a rectangular pillar shape like the supporting arm to which the first holding unit is attached may be used as the shape of the supporting arm to which the second holding unit is attached, or the shape in which two supporting rollers are supported on the lower face of the narrow plate member by interposing two pairs of coupling members may be used. In contrast, the shape of the supporting arm to which the first holding unit is attached described as the rectangular pillar-shaped rod member may be formed into a shape like the supporting arm to which the second holding unit shown in FIG. 2 or FIG. 5 is attached, or may be formed into a shape in which two coupling members as shown in FIG. 1(a) or FIG. 4(a) are attached to the upper face of one narrow plate so that a total of four supporting rollers are disposed thereon.

Figure 8B:
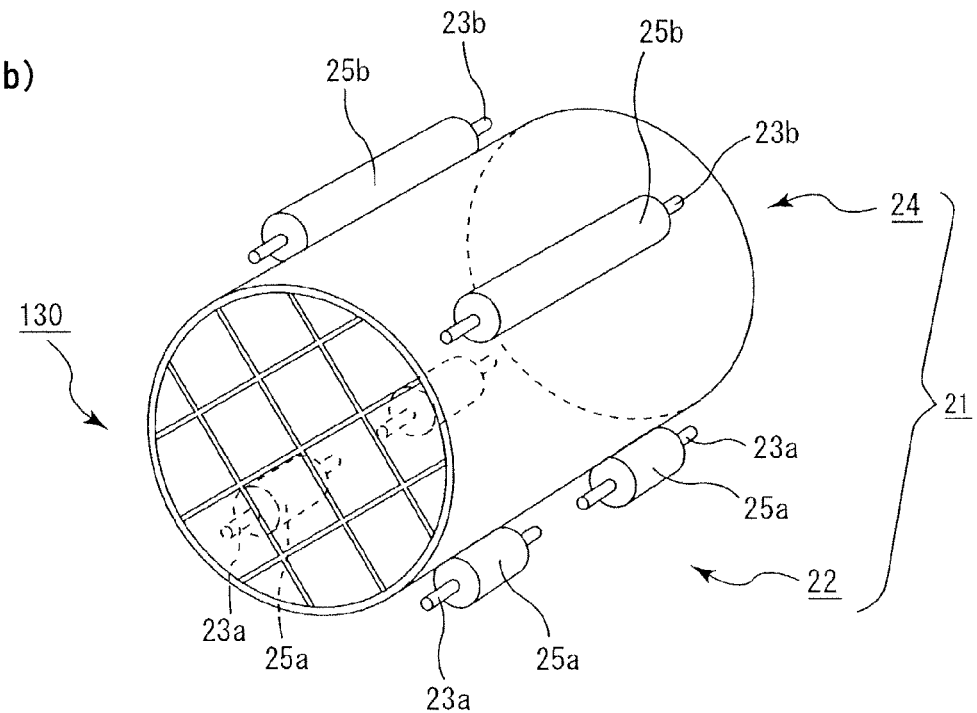
FIG. 8(b) is a perspective view that schematically shows another example of the holding mechanism with a honeycomb structure being held therein.

Here, by using the holding apparatus that has been described by reference to FIGS. 4(a), 4(b), 5 and 6, the following will describe the relationship between a honeycomb structure and the supporting rollers at the time when the honeycomb structure is held as an object to be held, by reference to FIG. 8(b). FIG. 8(b) is a schematic view that shows another example of the holding mechanism with a honeycomb structure being held thereby. Here, in FIG. 8(b) as well, the supporting arm and the coupling member are omitted for convenience of description.

The holding mechanism 21 shown in FIG. 8(b) has a first holding unit 22 including four supporting rollers 25a and a second holding unit 24 including two supporting rollers 25b. The holding mechanism 21 holds a honeycomb structure 130 by six supporting rollers at two positions on the upper side and at four positions on the lower side, that is, at a total of six positions. Also in the holding mechanism 21, the honeycomb structure 130 is surely held between the first holding unit 22 and the second holding unit 24, and upon holding, the orientation of the honeycomb structure 130 can be corrected naturally.

In this manner, the holding mechanism, which has been described by reference to FIGS. 8(*a*) and 8(*b*), is designed such a manner that one honeycomb structure 130 can be held between the first holding unit and the second holding unit; however, by altering the number of the supporting rollers respectively included in the first holding unit and the second holding unit, the number of honeycomb structures (objects to be held) to be held by a single holding mechanism can be altered on demand. Also, by altering the number of the holding mechanisms in the holding apparatus according to the embodiment of the present invention, the number of honeycomb structures to be held can be altered as well.

With respect to the mode of moving the first holding unit and the second holding unit in the holding apparatus according to the embodiment of the present invention, the above descriptions have given a mode in which a first holding unit is attached to the fixed supporting arm, with the second holding unit being allowed to move toward the fixed first holding unit, by reference to FIGS. 1(*a*), 1(*b*), 2 and 3(*a*)-(*c*); however, not limited to the above-mentioned mode, another mode in which the second holding unit is attached to a fixed supporting arm, with the first holding unit being allowed to move toward the fixed second holding unit, may be used, or both of the first holding unit and the second holding unit may be moved. Since supporting rollers, which can naturally correct the orientation of an object to be held at the time of holding, are attached to the first holding unit and the second holding unit, any of the modes make it possible to hold the object to be held surely and easily.

Of the modes of moving the above-mentioned first holding unit and second holding unit, in the case where the object to be held is held, with the first holding unit or the second holding unit being fixed, it is preferable to fix the holding unit including two supporting rollers.

In the case where an object to be held is made in contact with the two supporting rollers included in the fixed holding unit, since there are many supporting points used for supporting the object to be held, it becomes possible to improve the stability in the holding operation at the time of holding the object to be held. Here, in the case where the first holding unit and the second holding unit respectively have two supporting rollers attached thereto, either one of the holding units may be fixed.

In addition to the above-mentioned mode of moving the first holding unit and the second holding unit, the following mode of moving may be proposed as example. A supporting arm to which the first holding unit is attached and a supporting arm to which the second holding unit is attached are allowed to cross in the vicinity of the center portions thereof in an X-letter shape, with the crossing portion being fixed with a stopping member and the like in a rotatable manner, and the end portions of the first holding unit and the second holding unit to which the supporting rollers are attached are made closer to each other, like scissors, with the crossing portion serving as the fulcrum, so that the object to be held may be held. Even in the case of this mode of holding an object to be held, it is possible to naturally correct the orientation of the object to be held at the time of holding, and consequently to surely hold the object to be held.

At least either one of the above-mentioned first holding unit and the above-mentioned second holding unit is preferably attached to the supporting arm.

The description has given a mode in which both of the first holding unit including two supporting rollers and the second holding unit including one supporting roller are attached to the supporting arm; however, not limited to the above-mentioned mode, either one of the first holding unit and the second holding unit may be attached to the supporting arm, with the other holding unit being attached not to the supporting arm, but to, for example, the base, and the like. In any of these modes, it is possible to hold the object to be held efficiently and firmly.

Figure 7:
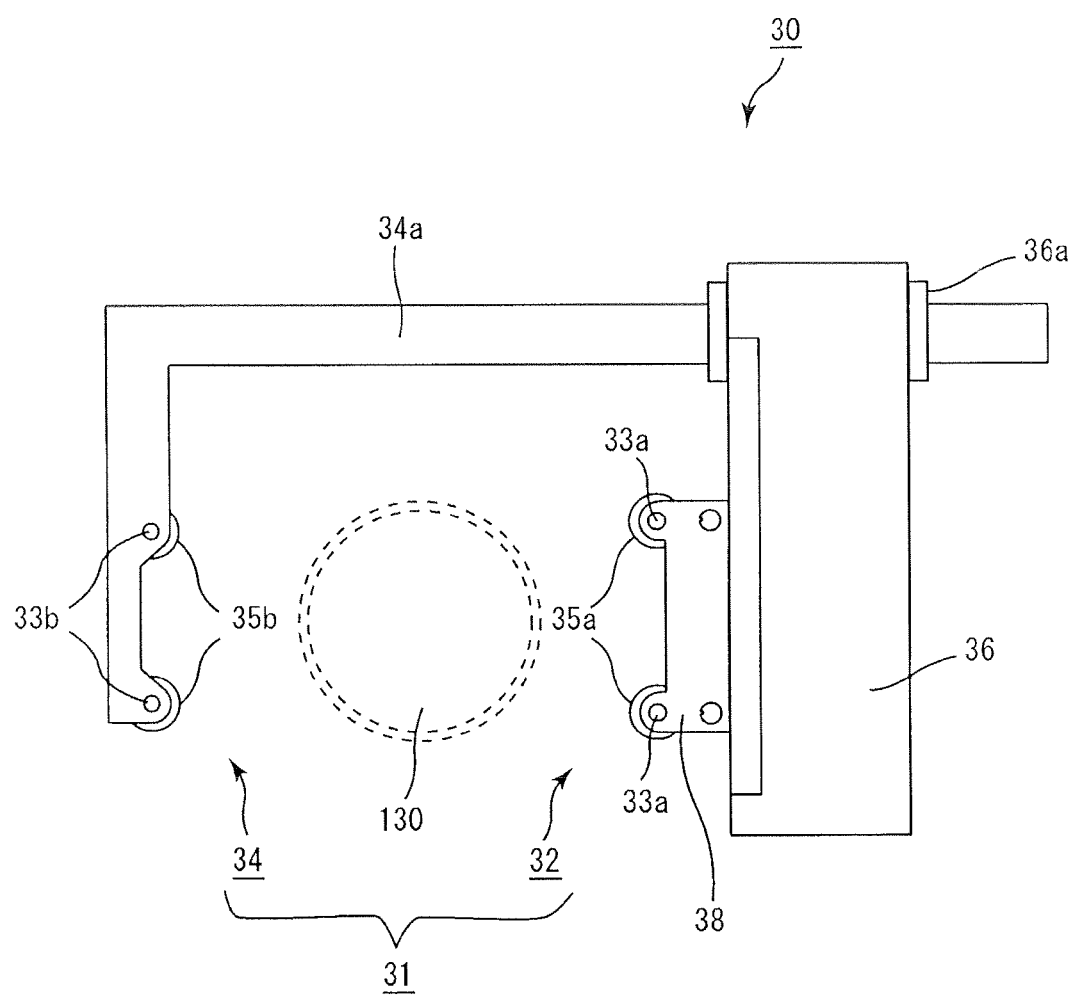
FIG. 7 is a side view that shows one example of still another embodiment of the holding apparatus of the present invention.

Referring to FIG. 7, the following will describe an embodiment of a holding apparatus in which the first holding unit is attached to the base, with the second holding unit being attached to a supporting arm. FIG. 7 is a side view that shows one example of still another embodiment of the holding apparatus of the present invention.

In the holding apparatus 30 shown in FIG. 7, a supporting arm 34*a* having an L-letter shape is inserted into a supporting hole 36*a* formed in the upper portion of the base 36, and supported thereon so as to slide. A first holding unit 32 is attached to the base 36 through a coupling member 38, and a second holding unit 34 is attached to a tip area on a bent portion of the supporting arm 34*a* in a manner so as to face the first holding unit 32.

The first holding unit 32 includes two supporting rollers 35*a*, and the second holding unit 34 also includes two supporting rollers 35*b*. Thus, the holding apparatus 30 has a single holding mechanism having the first holding unit 32 and the second holding unit 34.

In order to hold a honeycomb structure 130 as an object to be held by the holding apparatus 30, the supporting arm 34*a* is allowed to slide so that the second holding unit 34 attached to the supporting arm 34*a* is moved toward the first holding unit 32; thus, the honeycomb structure 130 is held between the first holding unit 32 and the second holding unit 34.

With the holding apparatus according to the embodiment of the present invention having the above-mentioned structure, it is possible to surely hold the honeycomb structure 130, with the orientation of the honeycomb structure 130 being naturally corrected at the time of holding.

The holding apparatus according to the embodiment of the present invention includes a first supporting arm to which a first holding unit is attached and a second supporting arm to which a second holding unit is attached, with the first supporting arm to which the above-mentioned first holding unit is attached and the second supporting arm to which the above-mentioned second holding unit is attached being made in parallel with each other, and one of the first and second supporting arms is preferably capable of moving toward the other supporting arm. By adopting the above-mentioned structure, upon holding an object to be held by using the holding apparatus according to the embodiment of the present invention, one of the supporting arms, which is kept stationary, is allowed to serve as a standard of the holding operation (that is, one of the supporting arms is made to be positioned near an object to be held); thus, it is possible to easily and safely hold the object to be held.

In the case where the supporting roller is attached to a single supporting arm, although the length of the supporting roller in the rotation shaft direction is not particularly limited, the length is preferably set in the range of 1 to 50% with respect to the length in the longitudinal direction of the honeycomb structure in the case where an object to be held is a honeycomb structure 130 shown in FIG. 11.

In the case where the above-mentioned length is less than 1%, the state of holding the object to be held becomes unstable to cause the possibility of falling of the object to be held or the possibility of a change in the orientation thereof when held; in contrast, in the case where the length exceeds 50%, upon placing the object to be held, the supporting arm to which the supporting roller is attached tends to come into contact with the placing surface to cause a failure in placing the object at a predetermined position.

Also, though the distance between the two supporting arms in the case where supporting rollers are attached to two supporting arms is not particularly limited, the distance is preferably set in the range of 15 to 90% with respect to the length in the longitudinal direction of the honeycomb structure, in the case where an object to be held is a honeycomb structure shown in FIG. 11.

In the case where the above-mentioned distance is less than 15%, the state of holding the object to be held becomes unstable to cause the possibility of falling of the object to be held or the possibility of a change in the orientation thereof when held; in contrast, in the case where the length exceeds 90%, in placing the object to be held, the supporting arm to which the supporting roller is attached tends to come into contact with the placing surface to cause a failure in placing the object at a predetermined position.

Referring to FIGS. 1(a) and 1(b), the mode in which one supporting roller is included in the second holding unit has been described, and referring to FIGS. 4(a) and 4(b), the mode in which two supporting rollers have been included in the second holding unit has been described; however, the number of the supporting rollers in the second holding unit may be one, or two, or three or more. In the same manner, it is only necessary for the first holding unit to include at least two supporting rollers, and the first holding unit may include three or more supporting rollers. Since an object to be held can be surely held by the first holding unit including at least two supporting rollers and the second holding unit including at least one supporting roller, the number of the supporting rollers can be preferably set depending on the shape of the object to be held, the conditions of transportation and the like.

In the case where two supporting rollers are included in each the first holding unit and second holding unit, the distance between the supporting rollers attached to the same holding unit may be altered depending on the size and the like of an object to be held, and in the case where the object to be held has a cylindrical shape, with the diameter of the end face thereof being set to 200 mm, for example, the above-mentioned distance between the supporting rollers is preferably set in the range of 50 to 200 mm.

In the case where the distance between the supporting rollers is less than 50 mm, upon holding the object to be held, the orientation thereof cannot be corrected in some cases; in contrast, the above-mentioned distance exceeding 200 mm tends to cause a limitation in holding the object to be held along the outer shape thereof, sometimes resulting in a limitation to objects to be held that can be handled.

In order to hold the object to be held along the outer shape thereof, a coupling member is disposed in the first holding unit, and a cut-out portion is formed in the second holding unit. In addition to these structures, appropriate structures, such as forming respective cut-out portions, attaching coupling members and using the cut-out portions and coupling members in combination, may be adopted on demand depending on the shapes of the supporting arms to which the first holding unit and the second holding unit are attached. Also, the height of the coupling member, the depth and shape of the cut-out portions and the like can be altered on demand depending on the size and the shape of the object to be held.

The distance between the upper face of the supporting arm to which the coupling member is fixed and the rotation shaft of the supporting roller may be altered on demand depending on the shape, the size and the like of an object to be held, and in the case where the object to be held has a cylindrical shape, with the diameter of the end face thereof being set to 200 mm, for example, the distance between the upper face of the above-mentioned supporting arm and the rotation shaft of the supporting roller is preferably set in the range of 50 to 200 mm.

In the case where the above-mentioned distance is less than 50 mm, the supporting roller tends to fail to come into contact with the object to be held along the outer shape thereof; in contrast, the distance exceeding 200 mm does not exert so much change on the effect for correcting the orientation of the object to be held, and causes the necessity of having to expand the distance between the first holding unit and the second holding unit so as to hold an object to be held, with the result that the holding apparatus becomes bulky. In the case of forming a cut-out portion, the depth of the cut-out portion may be set in virtually the same range as mentioned above.

The pressure applied in holding an object to be held is not particularly limited, and for example, in the case where the weight of an object to be held is 10 kg, the pressure to be applied upon holding the object to be held is preferably set in the range of 0.3 to 2.0 MPa.

In the case where the pressure to be applied upon holding is less than 0.3 MPa, the held object might fall in the middle of the transportation; in contrast, the pressure exceeding 2.0 MPa might cause damage to the object to be held.

Figure 3B:
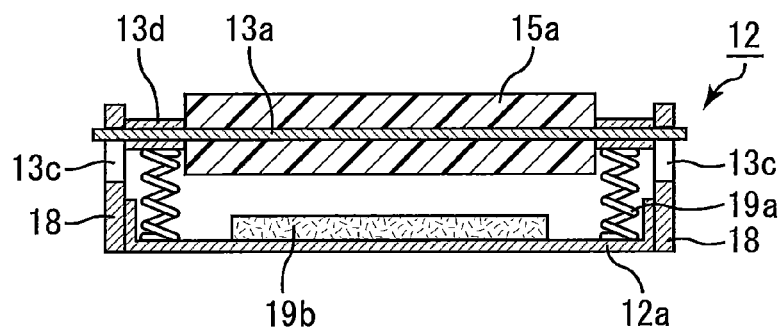
FIG. 3(b) is a cross-sectional view taken along line III(b) in FIG. 3(a) showing a coupling member in an expanded state.
Figure 3C:
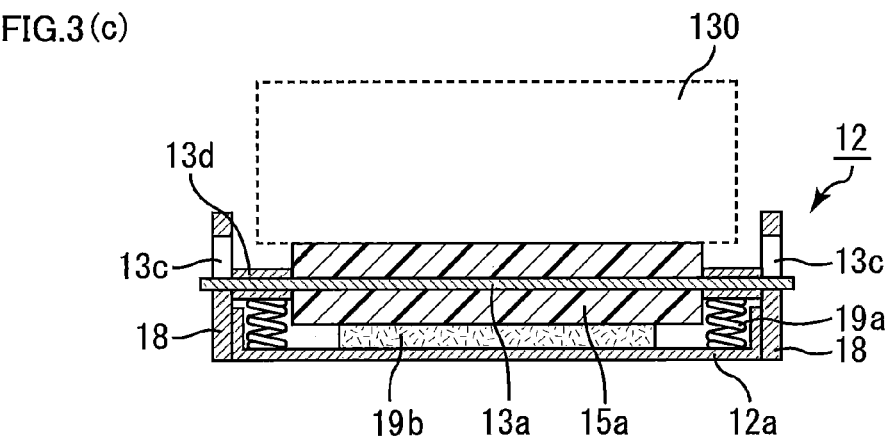
FIG. 3(c) is a cross-sectional view taken along line III(b) in FIG. 3(a) showing the coupling member in contact with an object to be held and in a shrunken state.

At least one of the above-mentioned first holding unit and the above-mentioned second holding unit preferably has a coupling member that can expand and shrink (see, for example, FIGS. 3(b) and 3(c)), and the above-mentioned at least one of the supporting rollers of the holding units is preferably coupled to the above-mentioned coupling member through the rotation shaft thereof.

Since the supporting roller of the first holding unit is coupled to the coupling member through the rotation shaft thereof, the supporting roller is made in contact with the object to be held along the outer shape thereof. Moreover, in the case where the coupling member can expand and shrink to act like a shock absorber (e.g., a damper), the impact in holding an object to be held can be alleviated so that it is possible to effectively prevent damages to the object to be held upon holding an object to be held. In particular, in the case where the above-mentioned coupling member can expand and shrink, and also can flexibly expand and shrink to act like a shock absorber by combining an elastic member 19a such as a spring, as shown in FIGS. 3(b) and 3(c), it is possible to alleviate the impact. In using a shock absorber as the coupling member, two shock absorbers are provided on the supporting arm, and each of the shock absorbers is coupled to each end of the rotation shaft 13a of the supporting roller 15a. Thus, the rotation shaft of the supporting roller is supported by the shock absorbers in a way that keeps a predetermined distance from the surface of the supporting arm. Also, both of the supporting roller of the first holding unit and the supporting roller of the second holding unit may be coupled to the coupling members through the rotation shafts thereof. In any of these modes, the impact upon holding an object to be held can be alleviated. The shock absorber can be provided in any manner such as an oil-shock absorber, spring-shock absorber, air-shock absorber, and any combination thereof.

The holding apparatus according to the embodiment of the present invention preferably has a rotation stopping member 19b, as shown in FIGS. 3(b) and 3(c), which comes into contact with the above-mentioned rotation shaft or the above-mentioned supporting roller to stop the rotation of the above-mentioned supporting roller in the case where the coupling member is shrunk by a predetermined distance as can be seen in FIG. 3(c). When an object 130 is held by the supporting holders having the expansible and shrinkable coupling member, the coupling member can shrink in the direction of reduction in a distance between the rotation shaft of the supporting roller and the surface of the supporting arm, while absorbing the shock or impact in holding the object. In this movement, the rotation stopping member 19b which is attached to the holding apparatus according to the embodiment of the present invention can stop the rotation of the supporting roller as a result of the contact between the rotation stopping member and the rotation shaft or the supporting roller when the coupling member is shrunk by the predetermined distance. Thus, it is possible to prevent the object to be held from rotating while the held object is being transported, and to prevent effectively the object from falling in the middle of the transporting process and the position of the object that has been held from being misaligned due to rotation. The structure of the rotation stopping member 19b is not particularly limited, and for example, a block member including an elastic material, a block member including resin with an increased frictional resistance on the surface or the like, may be used.

Here, the distance by which the coupling member is allowed to shrink may be appropriately set by taking into account the weight of the object to be held and the pressure or the like exerted upon holding the object to be held, and for example, the range of 5 to 50 mm can be exemplified.

An elastic material layer including an elastic material is preferably formed on the surface of the above-mentioned supporting roller.

In the case where such an elastic material layer is formed on the surface of the supporting roller, it becomes possible to absorb an impact in the case where the supporting roller is made in contact with the object to be held and to prevent damage to the object to be held, and also it becomes possible to hold the object to be held without causing damages onto the surface of the object to be held. Examples of the elastic material include synthetic rubber, natural rubber, silicon resin, urethane resin, epoxy resin, propylene resin, and the like.

The above-mentioned object to be held preferably has a pillar shape.

The shape of the object to be held is not particularly limited, and for example, objects to be held having any desired shape, such as a pillar shape, a cubic shape, a spherical shape, a plate shape and a deformed shape, may be used, and it is possible to surely hold an object to be held having any one of these shapes.

Among the above-mentioned shapes, in particular, the object to be held preferably has the pillar shape. With respect to the object to be held having the pillar shape, examples thereof include: a cylindrical shape, a rectangular pillar shape, a cylindroid shape, a pillar shape with a racetrack end face, an almost triangular prism shape and the like, and the cylindrical shape, the cylindroid shape and the pillar shape with a racetrack end face are more preferably used. This is because these shapes, which have much curved face portion, allow the orientation of the object that has been held to be corrected naturally by the rotation of the supporting rollers. Also, the shape of the object to be held is most preferably a cylindrical shape such as a honeycomb structure shown in FIG. 11. In the case where the object to be held has a cylindrical shape, the effect that the orientation of the object that has been held is corrected naturally by the rotation of the supporting rollers is most effectively exerted.

The holding apparatus 10 has one holding mechanism 11 formed by the first holding unit 12 and the second holding unit 14. It is possible to hold one object to be held by this single holding mechanism 11. Also, the holding apparatus 20 has one holding mechanism 21 formed by the first holding unit 22 and the second holding unit 24 so that this makes it possible to hold one object to be held. It may be acceptable for the holding apparatus according to the embodiment of the present invention to have at least one holding mechanism, and the number of the mechanisms is not limited. Therefore, in the case where the holding apparatus according to the embodiment of the present invention has a plurality of holding mechanisms, the holding apparatus is allowed to hold the same number of the objects to be held as the number of the holding mechanisms.

Figure 9:
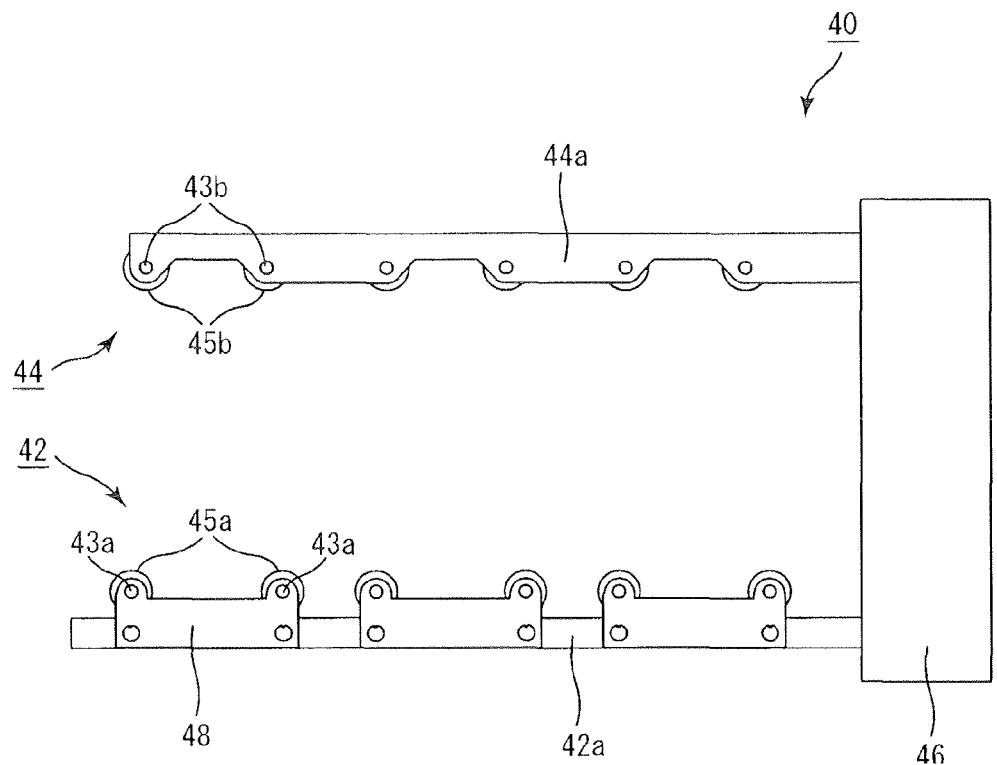
FIG. 9 is a side view that schematically shows one example of an embodiment of a holding apparatus of the present invention having a plurality of holding mechanisms.
Figure 10:
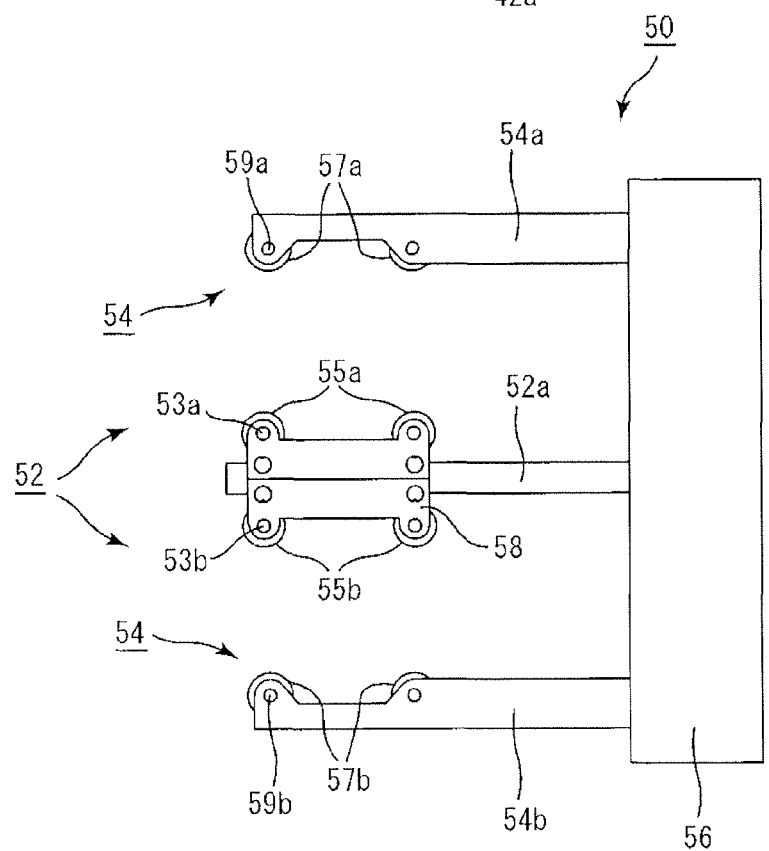
FIG. 10 is a side view that schematically shows another example of the embodiment of the holding apparatus of the present invention having a plurality of holding mechanisms.

Referring to FIG. 9 and FIG. 10, the following will describe variations in embodiments of the holding apparatus of the present invention having a plurality of holding mechanisms.

FIG. 9 is a side view that schematically shows one example of an embodiment of a holding apparatus of the present invention provided with a plurality of holding mechanisms, and FIG. 10 is a side view that schematically shows another example of the embodiment of the holding apparatus of the present invention having a plurality of holding mechanisms.

A holding apparatus 40 shown in FIG. 9 has three holding mechanisms, each having the same structure as the holding mechanism shown in FIG. 4(a), which are disposed in a direction away from a base portion 46.

In the holding apparatus 40, the first holding unit 42 is attached to two supporting arms 42a separated and disposed in parallel with each other as shown in FIG. 4(a), and the second holding unit 44 is attached to one supporting arm 44a. The supporting arm 42a and the supporting arms 44a are fixed to the base portion 46 to be supported thereon, and the second holding unit 44 attached to the supporting arms 44a is allowed to move toward the first holding unit 42 by a driving mechanism inside the base portion 46. Here, since FIG. 9 is a side view, one of the two supporting arms 42a to which the first holding unit 42 is attached is omitted.

To the supporting arm 42a to which the first holding unit 42 is attached, two supporting rollers 45a are coupled through a coupling member 48 by using rotation shafts 43a that are in parallel with each other. In contrast, to the supporting arm 44a to which the second holding unit 44 is attached, two supporting rollers 45b having rotation shafts 43b that are in parallel with the rotation shafts 43a of the supporting rollers 45a is attached, so as to face supporting rollers 45a.

In the embodiment shown in FIG. 9, as mentioned above, one holding mechanism is formed by one set of the first holding unit including the two supporting rollers 45a attached to the supporting arm 42a and the second holding unit including the two supporting rollers 45b attached to the end portion of the supporting arm 44a. Moreover, this embodiment has two additional sets of the first and second holding units having four supporting rollers which are respectively attached to the supporting arm 42a and the supporting arm 44a so as to be adjacent to the single holding mechanism. In the same manner as the one holding mechanism mentioned above, each of the two holding mechanisms are formed by the first holding unit and the second holding unit including the adjacent supporting rollers. Therefore, the holding apparatus 40 has three holding mechanisms altogether, and can hold three objects including two additional objects by these three holding mechanisms at one time.

Here, the number of the holding mechanisms is not particularly limited, and can be appropriately set in accordance with the number of processes to be carried out. With respect to the specific constituent members, the same structures of the holding apparatus as those described by reference to FIGS. 1(a), 1(b), 2, 3(a)-(c), 4(a), 4(b), 5 and 6 can be used suitably In the case where the holding apparatus 40 holds three objects at one time, the holding apparatus 40 is moved so that three objects to be held, which are mounted so as to be aligned to a certain degree, have positional relationships respectively corresponding to the three holding mechanisms. Then, the second holding unit 44 is moved toward the first holding unit 42 by driving the driving mechanism inside the base portion 46 so that the three objects to be held can be held by the three holding mechanisms at one time. Also, by holding the three objects to be held by using the respective supporting rollers, the orientations thereof when held can be naturally corrected; therefore, it is not necessary to align the orientations of the three objects to be held accurately prior to the holding process so that the holding processes of the objects to be held can be carried out efficiently and smoothly.

Next, the following will describe embodiments of the holding apparatus of the present invention shown in FIG. 10.

A holding apparatus 50 has two holding mechanisms that are the same as the holding mechanism shown in FIG. 4(a), and disposed symmetrically with a first holding unit 52 interposed therebetween.

The holding apparatus 50 is formed by a first supporting arm 52a to which a first holding unit 52 is attached, second and third supporting arms 54a and 54b to which two holding units 54 are attached, and a base portion 56. The second and third supporting arms 54a and 54b are disposed on the two sides of the first supporting arm 52a in a manner so as to pinch the first supporting arm 52a and so as to face the first supporting arm 52a in parallel with one another. The first supporting arm 52a and the second and third supporting arms 54a and 54b are coupled to a driving mechanism inside the base portion 56, and allowed to respectively move independently.

On the upper face of the first supporting arm 52a, two supporting rollers 55a are coupled to a coupling member 58 with their rotation shafts 53a. Two supporting rollers 57a, which have rotation shafts 59a in parallel with the supporting roller 55a, are attached to the second supporting arm 54a so as to face the supporting rollers 55a. Therefore, one holding mechanism is formed, which includes the above-mentioned four supporting rollers 55a and 57a disposed in the first holding unit 52 attached to the first supporting arm 52a and in the second holding unit 54 attached to the second supporting arm 54a.

In contrast, also on the lower face of the first supporting arm 52a, an additional holding unit is provided at the lower part of the first holding unit 52 in which two additional supporting rollers 55b are coupled to a coupling member 58 with their rotation shafts 53b. Two supporting rollers 57b, which have rotation shafts 59b in parallel with the supporting roller 55b, are attached to the third supporting arm 54b so as to face the supporting rollers 55b. Therefore, also on the lower face side of the supporting arm 52a, one additional holding mechanism is formed, which includes the above-mentioned four supporting rollers 55b and 57b respectively included in the lower part of the first holding unit 52 attached to the supporting arm 52a and the second holding unit 54 attached to the supporting arm 54b.

In this manner, the holding apparatus 50 shown in FIG. 10 has two holding mechanisms altogether. Also, since the first holding unit 52 and the two second holding units 54 are allowed to move independently, the holding apparatus 50 is allowed to hold two objects including one additional object at one time.

As one example for a sequence of operations used in the case where the holding apparatus 50 holds two objects to be held, the following operations are proposed: the holding apparatus 50 is moved so that two objects to be held, aligned to a certain degree, are located between the respective two holding mechanisms; and next, with the first holding unit 52 being fixed, the two second holding units 54 are moved simultaneously or independently toward the first holding unit 52.

Also, as one example for another sequence of operations, the following operations are proposed: with one of the second holding units 54 being fixed, the first holding unit 52 is moved toward the fixed second holding unit 54 so that one object is held; and the other second holding unit 54 is moved toward the first holding unit 52 so that the other object is held.

As one example for still another sequence of operations, the following operations are proposed: one of the first holding unit 52 and/or the second holding unit 54 has been moved to hold one object to be held; and then one holding mechanism having one set of the first holding unit 52 and one of the second holding units 54 by which this one object is held is moved toward the other second holding unit 54 so as to hold the other object to be held.

Any of the above-mentioned sequences of operations make it possible to hold two objects surely and efficiently. Also, the embodiment of the present invention may include other modes of the sequence of operations.

In order to freely move the entire holding apparatus in three dimensional directions, the holding apparatus according to the embodiment of the present invention may be coupled to a moving robot arm or the like. In the case where the holding apparatus according to the embodiment of the present invention is coupled to the moving robot arm or the like, the entire holding apparatus can be freely moved by the moving robot arm before and after holding an object to be held so that the holding, moving and placing operations of the object to be held can be carried out continuously and efficiently. Referring to a holding apparatus 10 shown in FIGS. 1(a) and 1(b), the following will describe this arrangement: for example, the back face of the base portion 16 (the face opposite to the holding mechanism 11) thereof may be coupled to a moving robot arm or the like. With this arrangement, after a honeycomb structure 130 has been held by the holding apparatus 10, the user can move the entire holding apparatus 10 to another position. Moreover, in the case where a rotation mechanism or the like is disposed between the base portion 16 and the above-mentioned moving robot arm, the orientation of the held honeycomb structure 130 can be rotated by 90° (for example, the longitudinal direction of the honeycomb structure 130 can be rotated from the vertical direction to the horizontal direction), and then the honeycomb structure 130 with the orientation thereof having been rotated can be moved to a predetermined position.

The holding apparatus according to the embodiment of the present invention is a holding apparatus which is used for a transporting process in manufacturing processes of a honeycomb structure in which: after a pillar-shaped honeycomb molded body in which a number of cells are disposed in parallel with one another in a longitudinal direction with a cell wall therebetween is manufactured by molding a ceramic material; and a honeycomb structure such as honeycomb fired bodies attained by firing the above-mentioned honeycomb molded body is manufactured, and the above-mentioned transporting process is preferably at least one of transporting processes including a honeycomb molded body transporting process, a honeycomb fired body transporting process and a honeycomb structure transporting process.

As mentioned above, since the holding apparatus according to the embodiment of the present invention makes it possible to surely hold an object to be held regardless of the shape of the object, it is used for a wide range of applications, and it is preferably used for holding a honeycomb molded body, a honeycomb fired body and a honeycomb structure (hereinafter, the honeycomb molded body, the honeycomb fired body and the honeycomb structure are also generally referred to as honeycomb products), which are manufactured in manufacturing processes for the honeycomb structure. The honeycomb products include brittle materials, and they often cause difficulty in holding and transporting. For example, the honeycomb product may fall to be damaged in the middle of the transporting process, or may be damaged in mounting due to a tilted orientation when held. The holding apparatus according to the embodiment of the present invention makes it possible to correct the orientation of the object to be held when it is held, and to surely hold the object to be held; therefore, the above-mentioned honeycomb products can be suitably used for holding.

Here, with respect to the method for manufacturing the above mentioned honeycomb products including the respective transporting processes, the description thereof will be given below together with the method for manufacturing a honeycomb structure according to the embodiment of the present invention.

The method for manufacturing a honeycomb structure according to the embodiment of the present invention includes manufacturing processes in which: after a pillar-shaped honeycomb molded body in which a number of cells are disposed in parallel with one another in a longitudinal direction with a cell wall therebetween is manufactured by molding a ceramic material; and a honeycomb structure such as honeycomb fired bodies attained by firing the above-mentioned honeycomb molded body is manufactured. The method further includes at least one of the transporting steps of: transporting a honeycomb molded body to the apparatus used in the firing process; transporting a honeycomb fired body to the apparatus used in the honeycomb structure forming process; and transporting a honeycomb structure to the apparatus used in an inspecting process. The transportation step is conducted by using a holding apparatus that includes a first holding unit including at least two supporting rollers rotatable around rotation shafts which extend substantially parallel with each other; a second holding unit including at least one supporting roller rotatable around rotation shaft; and at least one holding mechanism having the above-mentioned first holding unit and the above-mentioned second holding unit. The rotation shafts of the supporting rollers of the above-mentioned first holding unit and the rotation shaft of the supporting roller of the above-mentioned second holding unit are substantially in parallel with each other. By moving at least one of the above-mentioned first holding unit and the above-mentioned second holding unit, an object to be held is held between the above-mentioned first holding unit and the above-mentioned second holding unit by using the supporting rollers.

In accordance with the method of the embodiment of the present invention, in a predetermined transporting process of the entire manufacturing processes, a constituent member or the like, which has undergone the respective processes, is held by using the holding apparatus of the embodiment of the present invention so that it becomes possible to effectively prevent defects from occurring in the transporting process that tends to cause damages. In particular, since a honeycomb structure, which is a finished product that has conventionally required careful handling, can be surely and easily held, it becomes possible to efficiently improve the productivity of the entire manufacturing processes.

Figure 12A:
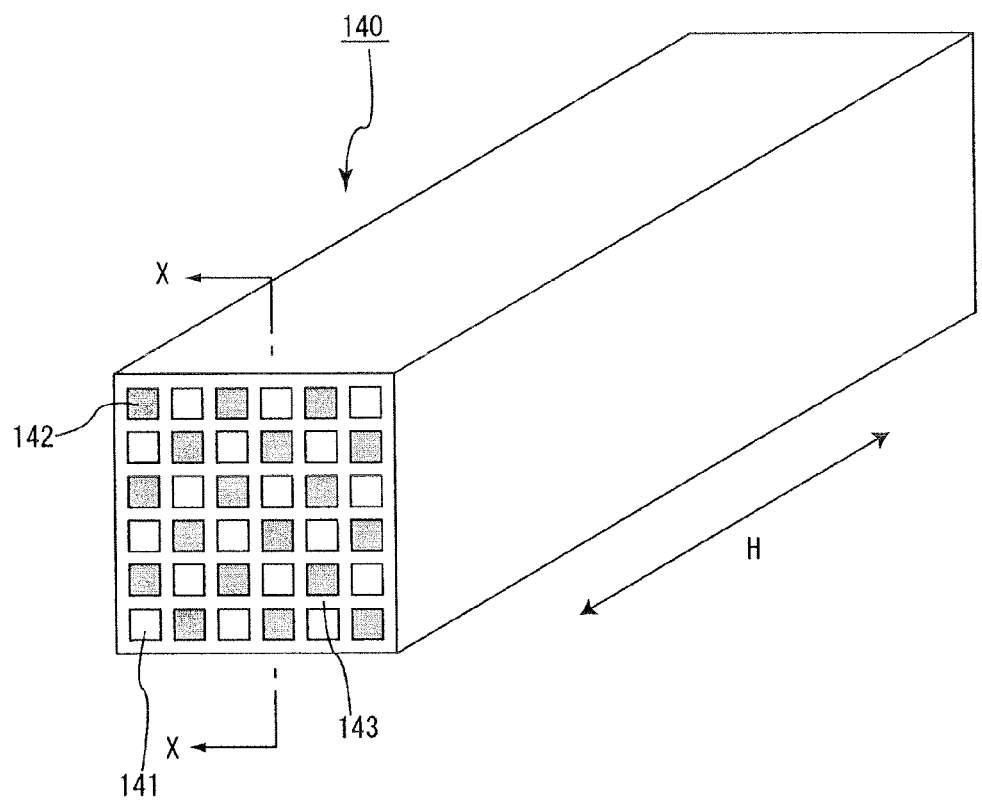
FIG. 12(a) is a perspective view that schematically shows a honeycomb fired body that forms the above-mentioned honeycomb structure.
Figure 12B:
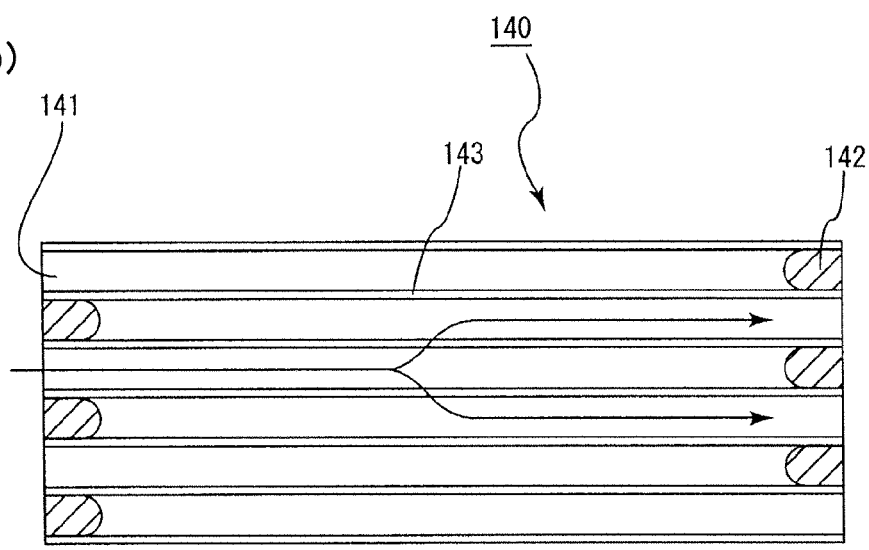
FIG. 12(b) is an X-X line cross sectional view of FIG. 12(a).

FIG. 11 is a perspective view that schematically shows one example of a honeycomb structure, FIG. 12(a) is a perspective view that schematically shows a honeycomb fired body that forms the above-mentioned honeycomb structure, and FIG. 12(b) is an X-X line cross-sectional view of the honeycomb fired body shown in FIG. 12(a).

In a honeycomb structure 130, a plurality of honeycomb fired bodies 140, as shown in FIG. 12(a), are combined with one another by interposing sealing material layers (adhesive layers) 131 so that a ceramic block 133 is formed, and furthermore, a sealing material layer (coat layer) 132 is formed on the outer circumference of the ceramic block 133.

Also, as shown in FIG. 12(a), a number of cells 141 are disposed in parallel in a longitudinal direction (the direction shown by a double-headed arrow H in FIG. 12(a)) with one another, and a cell wall 143 that separates the cells 141 from each other is allowed to function as a filter.

In other words, as shown in FIG. 12(b), each of the cells 141 formed in the honeycomb fired body 140 has either one of the ends corresponding to the inlet side or the outlet side of exhaust gases sealed by a plug material layer 142. Exhaust gases flowing into one cell 141 are allowed to flow out from another cell 141 after always having passed through the cell wall 143 separating the cells 141, thus, in the case where exhaust gases pass through the cell wall 143, particulates are captured by the cell wall 143 so that the exhaust gases are purified.

In the present specification, in each of the modes of the honeycomb molded body, the honeycomb fired body and the honeycomb structure, among faces forming the outer shape thereof, the face with exposed cells is referred to as an end face, and faces other than the end face are referred to as side faces, and the direction in which cells are formed is referred to as the longitudinal direction (the direction shown by double-headed arrows G and H, in FIGS. 11 and 12(a)).

The following will describe the method for manufacturing a honeycomb structure according to the embodiment of the present invention in the order of processes.

Here, taking as an example the case of manufacturing a honeycomb structure wherein the main constituent material is silicon carbide, the method for manufacturing the honeycomb structure where a silicon carbide powder, which is a ceramic material, is used will be described.

Of course, the main constituent material for the honeycomb structure is not limited to silicon carbide, and examples of the other ceramic materials include: a nitride ceramic material such as aluminum nitride, silicon nitride, boron nitride and titanium nitride; a carbide ceramic material such as zirconium carbide, titanium carbide, tantalum carbide and tungsten carbide; and an oxide ceramic material such as alumina, zirconia, cordierite, mullite and aluminum titanate and the like.

Among these, a non-oxide ceramic material is preferably used, and in particular, silicon carbide is more preferably used. This material is superior in the heat resistance, mechanical strength, thermal conductivity, and the like. Here, a silicon-containing ceramic material prepared by compounding metal silicon into the above-mentioned ceramic material and a ceramic material in which ceramic is bonded by silicon or a silicate compound may be used as a constituent material, and among these, a material prepared by compounding metal silicon into silicon carbide (silicon-containing silicon carbide) is preferably used.

First, as a ceramic material, an inorganic powder such as silicon carbide powders having different average particle diameters and an organic binder are dry-mixed to prepare a powder mixture, and a liquid mixture is prepared by mixing a liquid-state plasticizer, a lubricant and water, and successively, the above-mentioned powder mixture and the above-mentioned liquid mixture are mixed by using a wet mixer so that a wet mixture for manufacturing a molded body is prepared.

The particle diameters of the above-mentioned silicon carbide powders are not particularly limited, and the diameters which are less susceptible to shrinkage in the succeeding firing process are preferably used, and for example, a powder mixture prepared by combining 100 parts by weight of the powder having an average particle diameter in the range of about 0.3 to 50 μm and 5 to 65 parts by weight of the powder having an average particle diameter in the range of about 0.1 to 1.0 μm, is preferably used. In order to adjust the pore diameter and the like of the honeycomb fired body, it is necessary to adjust the firing temperature, and also by adjusting the particle diameter of the organic powder, the pore diameter can be adjusted.

The above-mentioned organic binder is not particularly limited, and examples thereof include: methyl cellulose, carboxymethyl cellulose, hydroxyethyl cellulose, polyethylene glycol and the like. Among these, methyl cellulose is more preferably used.

In general, the blending amount of the above-mentioned binder is preferably set to about 1 to 10 parts by weight with respect to 100 parts by weight of the inorganic powder.

The above-mentioned plasticizer is not particularly limited, and for example, glycerin may be used.

Also, the above-mentioned lubricant is not particularly limited, and for example, polyoxy alkylene-based compounds, such as polyoxyethylene alkyl ether and polyoxypropylene alkyl ether, may be used.

Specific examples of the lubricant include: polyoxyethylene monobutyl ether, polyoxypropylene monobutyl ether and the like.

Here, the plasticizer and the lubricant are not necessarily contained in the mixed material powder depending on cases.

Also, upon preparing the above-mentioned wet mixture, a dispersant solution may be used, and with respect to the above-mentioned dispersant solution, examples thereof include: water, an organic solvent such as benzene, and alcohol such as methanol, and the like.

Moreover, a molding auxiliary may be added to the above-mentioned wet mixture.

The above-mentioned molding auxiliary is not particularly limited, and examples thereof include: ethylene glycol, dextrin, fatty acid, fatty acid soap, polyalcohol, and the like.

Furthermore, a pore-forming agent such as balloons that are micro hollow spheres composed of oxide-based ceramics, spherical acrylic particles and graphite may be added to the above-mentioned wet mixture, if necessary.

The above-mentioned balloons are not particularly limited, and for example, alumina balloons, glass micro-balloons, shirasu balloons, fly ash balloons (FA balloons) and mullite balloons and the like may be used. Among these, alumina balloons are more preferably used.

Here, the wet mixture using a silicon carbide powder prepared as mentioned above is preferably at a temperature of 28° C. or less. In the case where the temperature is too high, the organic binder tends to gel.

Also, the rate of organic components in the above-mentioned wet mixture is preferably 10% by weight or less, and the content of moisture is preferably in the range of 8.0 to 20.0% by weight.

The above-mentioned wet mixture is transported after prepared, and carried into a molding machine.

The wet mixture that has been carried into the extrusion-molding machine transported by the above-mentioned transporting apparatus is formed into a honeycomb molded body having a predetermined shape through the extrusion-molding process.

Next, the above-mentioned honeycomb molded body is dried by using a drying apparatus, such as a microwave drying apparatus, a hot-air drying apparatus, a dielectric drying apparatus, a reduced-pressure drying apparatus, a vacuum drying apparatus and a freeze drying apparatus, so that a dried honeycomb molded body is manufactured.

Next, a cutting process in which the two ends of the manufactured honeycomb molded body are cut is carried out so that the honeycomb molded body is cut into a predetermined length.

Next, if necessary, a predetermined amount of sealing material paste to form plugs is injected to end portions on the outlet side of cells as well as to end portions on the inlet side of cells so that the cells are sealed. Upon plugging the cells, a plugging mask is applied to the end face of the honeycomb molded body (that is, a cut face after the cutting process), and the sealing material paste is filled only into the cells that need to be sealed.

The above-mentioned sealing material paste is not particularly limited, and the sealing material pastes that allow the plugs manufactured through the following processes to have a porosity in the range of 30 to 75% are preferably used, and, for example, the same material as that of the above-mentioned wet mixture may be used.

The filling process of the above-mentioned sealing material paste can be carried out on demand, and in the case where the above-mentioned sealing material paste has been filled, for example, the honeycomb structure attained through the following process is suitably used as a honeycomb filter, and in the case where no sealing material paste has been filled, for example, the honeycomb structure attained through the following process is suitably used as a catalyst supporting carrier.

Next, the honeycomb molded body, in which the above-mentioned sealing material paste has been filled, is transported to a degreasing furnace by a degreasing furnace carry-in apparatus so as to carry out a degreasing process thereon.

The honeycomb molded body is carried into the degreasing furnace by the above-mentioned degreasing furnace carry-in apparatus, and then a degreasing process is carried out thereon under predetermined conditions (for example, at a temperature of 200 to 500° C.).

Next, the degreased honeycomb molded body is transported to a firing furnace so as to carry out a firing process thereon.

Here, in the method for manufacturing a honeycomb structure according to the embodiment of the present invention, a step of transporting the honeycomb molded body to the firing process is carried out by using a holding apparatus that includes a first holding unit including at least two supporting rollers rotatable around rotation shafts which extend substantially parallel with each other; a second holding unit including at least one supporting roller rotatable around a rotation shaft; and at least one holding mechanism having the above-mentioned first holding unit and the above-mentioned second holding unit. The rotation shafts of the supporting rollers of the above-mentioned first holding unit and the rotation shaft of the supporting roller of the above-mentioned second holding unit are substantially in parallel with each other By moving at least one of the above-mentioned first holding unit and the above-mentioned second holding unit, an object to be held is held between the above-mentioned first holding unit and the above-mentioned second holding unit by using the supporting rollers. With respect to this holding apparatus, the above-mentioned holding apparatus according to the embodiment of the present invention can be suitably used.

Since the holding apparatus according to the embodiment of the present invention may be used for objects having any shape, even in the case of a rectangular pillar-shaped honeycomb molded body as shown in FIG. 12(a), it can hold the honeycomb molded body surely and efficiently. Therefore, in the method for manufacturing a honeycomb structure according to the embodiment of the present invention, the honeycomb molded body transporting process is not limited to the transporting process used for transporting the degreased honeycomb molded body to the firing process, and includes one portion or the entire portions of the transporting processes used after attaining the honeycomb molded body by extrusion-molding a ceramic material, which are required until the honeycomb molded body has been fired. Since the holding apparatus according to the embodiment of the present invention makes it possible to surely and efficiently hold and to transport even such a rectangular pillar-shaped honeycomb molded body, it becomes possible to effectively improve the transporting efficiency, while preventing damages that may be caused upon holding and transporting.

With respect to the mode in which the above-mentioned honeycomb mold body transporting process is carried out by using the holding apparatus, for example, the following process is proposed as a degreased honeycomb molded body transporting process: a holding apparatus shown in FIG. 4(a) is placed near the outlet of the degreasing furnace; a honeycomb molded body carried out from the degreasing furnace is held by the above-mentioned holding apparatus; and the held honeycomb molded body is transported to the vicinity of the inlet of the firing furnace. Upon holding the honeycomb molded body by using the above-mentioned holding apparatus, the honeycomb molded body is held, with the supporting rollers being made in contact with the side faces of the honeycomb molded body. Therefore, in the case where the honeycomb molded body is held by the above-mentioned holding apparatus, the supporting rollers are made in contact with all the four side faces of the honeycomb molded body so that the honeycomb molded body is held by the four supporting rollers. With respect to the honeycomb molded body transporting process, transporting processes other than those transporting processes exemplified here is included, and any of the transporting processes can be carried out suitably by using the holding apparatus according to the embodiment of the present invention.

In order to hold and transport a honeycomb product by the holding apparatus according to the embodiment of the present invention, for example, a known robot arm mechanism, crane mechanism, and the like, is attached to the base portion 26 of the holding apparatus 20 as shown in FIG. 4(a) so that the holding apparatus can be used as a holding and transporting apparatus.

Thus, the honeycomb molded body is transported to the firing furnace by using the transporting apparatus, and by cooling the resulting honeycomb fired body, it is possible to manufacture a honeycomb fired body of which the entire portion is made of a single fired body, and in which a plurality of cells are disposed in parallel with one another in a longitudinal direction with a cell wall therebetween, with either one of the ends thereof being sealed (refer to FIG. 12(a), (b)).

Next, the attained honeycomb fired body is transported to a honeycomb structure forming process used for forming a honeycomb structure including the honeycomb fired body as a constituent unit. Here, the honeycomb fired body transporting process is carried out by using the holding apparatus according to the embodiment of the present invention. Although the honeycomb fired body has a rectangular pillar shape, it is possible to firmly hold by the above-mentioned holding apparatus in the same manner as the above-mentioned honeycomb molded body.

Next, a sealing material paste to form a sealing material layer (adhesive layer) is applied onto side faces of the honeycomb fired body with a uniform thickness to form a sealing material paste layer, and a process for laminating another honeycomb fired body on this sealing material paste layer is successively repeated so that an aggregated body of honeycomb fired bodies having a predetermined size is manufactured.

Also, in the case where an aggregated body of honeycomb fired bodies with sealed cells is manufactured, honeycomb molded bodies with sealed cells are mutually assembled by interposing a spacer in advance, and by filling a sealing material paste into gaps between the honeycomb fired bodies with sealed cells so that the aggregated body of honeycomb fired bodies with sealed cells may be manufactured.

With respect to the above-mentioned sealing material paste, examples thereof include a material containing an inorganic binder, an organic binder and inorganic fibers and/or inorganic particles.

With respect to the above-mentioned inorganic binder, for example, silica sol, alumina sol and the like may be used. Each of these may be used alone or two or more kinds of these may be used in combination. Among the inorganic binders, silica sol is more preferably used.

With respect to the above-mentioned organic binder, examples thereof include polyvinyl alcohol, methyl cellulose, ethyl cellulose, carboxymethyl cellulose and the like. Each of these may be used alone or two or more kinds of these may be used in combination. Among the above-mentioned organic binders, carboxymethyl cellulose is more preferably used.

With respect to the above-mentioned inorganic fibers, examples thereof include ceramic fibers such as silica-alumina, mullite, alumina, silica and the like. Each of these may be used alone or two or more kinds of these may be used in combination. Among the above-mentioned inorganic fibers, alumina fibers are more preferably used.

With respect to the above-mentioned inorganic particles, examples thereof include carbides, nitrides and the like, and specific examples include an inorganic powder including silicon carbide, silicon nitride, boron nitride and the like. Each of these may be used alone, or two or more kinds of these may be used in combination. Among the above-mentioned inorganic particles, silicon carbide having superior thermal conductivity is preferably used.

Moreover, a pore-forming agent, such as balloons that are micro hollow spheres including an oxide-based ceramic material, spherical acrylic particles and graphite, may be added to the above-mentioned sealing material paste, if necessary.

The above-mentioned balloons are not particularly limited, and for example, alumina balloons, glass micro-balloons, shirasu balloons, fly ash balloons (FA balloons), mullite balloons and the like may be used. Among these, alumina balloons are more preferably used.

Next, this aggregated body of the honeycomb fired bodies is heated so that the sealing material paste layers are dried and solidified to form sealing material layers (adhesive layers).

Next, a cutting process is carried out to the aggregated body of the honeycomb fired bodies in which a plurality of honeycomb fired bodies have been bonded to one another by interposing sealing material layers (adhesive layers) so that a cylindrical honeycomb block is manufactured.

In addition to the honeycomb fired body transporting process after the firing process, the transporting process of the honeycomb fired body in the method for manufacturing a honeycomb structure of the present according to the embodiment invention also includes a process of transporting the above-mentioned ceramic blocks. In other words, the transporting process of the honeycomb fired bodies includes one portion or the entire portions of the transporting processes required from the transporting process for transporting the honeycomb fired body taken out from the firing furnace up to the manufacture of the aggregated body of the honeycomb fired bodies.

Then, a sealing material layer (coat layer) is formed on the outer periphery of the ceramic block by using the above-mentioned sealing material paste so that a honeycomb structure in which a sealing material layer (coat layer) is formed on the outer periphery of a cylindrical honeycomb block in which a plurality of honeycomb molded bodies are bonded to one another by interposing sealing material layers (adhesive layers) is manufactured.

Thereafter, a catalyst is supported on the honeycomb structure on demand. The above-mentioned supporting process of the catalyst may be carried out on the honeycomb molded bodies prior to being formed into an aggregated body.

In the case where a catalyst is supported thereon, an alumina film having a high specific surface area is preferably formed on the surface of the honeycomb structure, and a co-catalyst and a catalyst such as platinum are applied onto the surface of the alumina film.

With respect to the method for forming the alumina film on the surface of the above-mentioned honeycomb structure, for example, a method in which the honeycomb structure is impregnated with a solution of a metal compound containing aluminum such as $Al(NO_3)_3$ and then heated, and a method in which the honeycomb structure is impregnated with a solution containing an alumina powder and then heated, are proposed.

With respect to the method for applying a co-catalyst to the above-mentioned alumina film, for example, a method in which the honeycomb structure is impregnated with a solution of a metal compound containing a rare-earth element, such as $Ce(NO_3)_3$, and then heated is proposed.

With respect to the method for applying a catalyst to the above-mentioned alumina film, for example, a method in which the honeycomb structure is impregnated with a solution such as dinitrodiammine platinum nitric acid ($[Pt(NH_3)_2(NO_2)_2]HNO_3$, platinum concentration: 4.53% by weight) and then heated is proposed.

Also, a catalyst may be applied through a method in which after the catalyst has been applied to alumina particles in advance, the honeycomb structure is impregnated with a solution containing the alumina powder to which the catalyst is applied, and then heated.

Also, the above-mentioned method for manufacturing a honeycomb structure is a method for manufacturing an aggregated honeycomb structure in which a plurality of honeycomb fired bodies are bonded to one another by interposing sealing material layers (adhesive layers); however, the honeycomb structure to be manufactured by the method according to the embodiment of the present invention may be an integral honeycomb structure in which a pillar-shaped ceramic block is formed by one honeycomb molded body. Here, a main constituent material of the integral honeycomb structure is preferably cordierite or aluminum titanate.

Upon manufacturing such an integral honeycomb structure, first, a honeycomb molded body is manufactured by using the same method as the method for manufacturing an aggregated honeycomb structure except that the size of a honeycomb molded body to be molded through the extrusion-molding process is greater than that of the aggregated honeycomb structure.

Next, in the same manner as the method for manufacturing the aggregated honeycomb structure, the honeycomb molded body is dried by using a drying apparatus such as a microwave drying apparatus, a hot-air drying apparatus, a dielectric drying apparatus, a reduced-pressure drying apparatus, a vacuum drying apparatus and a freeze drying apparatus.

Next, a cutting process is carried out to the dried honeycomb molded body so that the two end portions thereof are cut.

Next, a predetermined amount of sealing material paste to form plugs is filled into end portions on the outlet side of cells as well as to end portions of cells on the flow-out side so that the cells are sealed.

Thereafter, in the same manner as the manufacturing of the aggregated honeycomb structure, degreasing and firing processes are carried out so that a ceramic block is manufactured, and sealing material layers (coat layers) are formed, if necessary, so that an integral honeycomb structure can be manufactured. Also, a catalyst may be supported on the above-mentioned integral honeycomb structure as well, by using the above-mentioned method.

In order to carry out predetermined inspections such as a form inspection and an appearance inspection, on the integral honeycomb structure or the aggregated honeycomb structure manufactured in this manner, the above-mentioned honeycomb structure is transported to inspecting processes. In the method for manufacturing a honeycomb structure according to the embodiment of the present invention, this honeycomb structure transporting process is also carried out by using the holding apparatus according to the embodiment of the present invention. With respect to the sequence of operations used for holding and transporting the honeycomb structure, the sequence of operations, described in the description of the holding apparatus according to the embodiment of the present invention, can be suitably used.

In the respective processes of the method for manufacturing a honeycomb structure according to the embodiment of the present invention, it has been described that all the processes of the honeycomb molded body transporting process, the honeycomb fired body transporting process and the honeycomb structure transporting process are carried out by using the holding apparatus according to the embodiment of the present invention. However, in the present manufacturing method, all the transporting processes are not necessarily carried out by using the holding apparatus of the present invention, and it is only necessary to carry out at least one of transporting processes including the honeycomb molded body transporting process, the honeycomb fired body transporting process and the honeycomb structure transporting process. In the case where any one of the transporting processes is carried out by using the above-mentioned holding apparatus, it is possible to effectively prevent the held object from falling in the middle of the transporting process and the orientation of the honeycomb structure from tilting when held to cause damages to the honeycomb structure when placed.

At least one of the above-mentioned first holding unit and the above-mentioned second holding unit is preferably attached to the supporting arm.

In this case, since the degree of freedom in operations in which the honeycomb structure to be held is held can be enhanced without using complex procedures and expensive apparatuses and the like, the usefulness upon holding an object to be held of the holding apparatus according to the embodiment of the present invention can be improved.

In the method for manufacturing a honeycomb structure according to the embodiment of the present invention, the above-mentioned holding apparatus has a first supporting arm to which the above-mentioned first holding unit is attached and a second supporting arm to which the above-mentioned second holding unit is attached. The first supporting arm to which the above-mentioned first holding unit is attached and the second supporting arm to which the above-mentioned second holding unit is attached are substantially in parallel with each other, and one of the first supporting arm to which the above-mentioned first holding unit is attached and the second supporting arm to which the above-mentioned second holding unit is attached is preferably capable of moving toward the other supporting arm.

With this arrangement, upon holding a honeycomb product by using the holding apparatus, the holding operation can be carried out based upon one of the supporting arms that is kept stationary (that is, one of the supporting arms is positioned close to the honeycomb product); thus, it becomes possible to hold the honeycomb product more easily as well as more safely.

In the method for manufacturing a honeycomb structure according to the embodiment of the present invention, the above-mentioned first holding unit and/or the above-mentioned second holding unit is preferably attached to a plurality of supporting arms, each including the same number of supporting rollers, that are separated and disposed in parallel with one another.

In accordance with the shape of a honeycomb product to be held, the number of supporting points formed by the supporting arms can be changed so that it becomes possible to deal with various shapes of honeycomb products.

In the method for manufacturing a honeycomb structure according to the embodiment of the present invention, at least one of the above-mentioned first holding unit and the above-mentioned second holding unit preferably has a coupling member that can expand and shrink, and the above-mentioned at least one of the supporting rollers is preferably coupled to the coupling member through the rotation shaft thereof.

Thus, since it is possible to alleviate the impact at the time of holding, even a honeycomb product including a brittle material can be effectively held and transported while preventing damages thereto.

In the method for manufacturing a honeycomb structure according to the embodiment of the present invention, the above-mentioned transporting apparatus preferably has a rotation stopping member which, in the case where the above-mentioned coupling member is shrunk by a predetermined distance, comes into contact with the above-mentioned rotation shaft or the above-mentioned supporting roller to stop the rotation of the above-mentioned supporting roller.

This makes it possible to prevent the orientation of the honeycomb structure from being changed in the middle of its transportation, and consequently to easily place it at an appropriate position at the destination. In particular, in the case where the honeycomb product has a cylindrical shape, it becomes possible to effectively prevent the honeycomb product from rotating around the shaft in the longitudinal direction, and consequently to transport and place the honeycomb product with an appropriate orientation being maintained, even in the case where the direction of the honeycomb product as the position and orientation after the mounting process becomes important.

In the method for manufacturing a honeycomb structure according to the embodiment of the present invention, an elastic material layer including an elastic material is preferably formed on the surface of the above-mentioned supporting roller.

Thus, even in the case of a honeycomb product including a brittle material, it becomes possible to prevent damages due to the impact upon holding, and also to hold and transport the product efficiently and easily.

The above-mentioned transporting process is preferably the above-mentioned honeycomb structure transporting process, and the honeycomb structure preferably has a cylindrical shape, a cylindroid shape or a pillar shape with a racetrack end face.

Since the honeycomb structure manufactured by the present manufacturing method is not an intermediate product, but a final product, it needs to be carefully handled, or since the honeycomb structure has a cylindrical shape, a cylindroid shape or a pillar shape with a racetrack end face as shown in FIG. 11, it is difficult to hold in some cases; however, the embodiment the present invention makes it possible to hold such a honeycomb structure surely and effectively, and is suitably used for holding such a product.

Also, the number of honeycomb products to be held by using the above-mentioned holding apparatus is not limited to one, and a plurality of honeycomb products may be held at one time, and the respective transporting processes may be carried out. In this case, those holding apparatuses described as variations of the holding apparatus according to the embodiment of the present invention by reference to FIGS. 9 and 10 may be suitably used.

As mentioned above, the method for manufacturing a honeycomb structure according to the embodiment of the present invention makes it possible to manufacture the honeycomb structure with high operating efficiency.

Also, in the case where the honeycomb structure is manufactured by using the above-mentioned method, since a honeycomb product that has undergone the respective processes is transported by using the holding apparatus according to the embodiment of the present invention at any transporting processes of all the manufacturing processes, the honeycomb product, which has conventionally required careful handling, can be transported surely and easily. Also, by carrying out the respective transporting processes by using the holding apparatus according to the embodiment of the present invention, the cooperation of a sequence of operating processes can be carried out smoothly, so that the product line can be designed more efficiently. Thus, the method for manufacturing a honeycomb structure according to the embodiment of the present invention makes it possible to further improve the efficiency of the entire manufacturing processes.

Also hereinabove, with respect to the honeycomb structure, the foregoing description has been given mainly on a honeycomb filter that is used to capture particulates in exhaust gases; however, the honeycomb structure may be also used suitably as a catalyst supporting carrier (honeycomb catalyst) that converts exhaust gases.

EXAMPLES

The following will describe the present invention in more detail by means of examples; however, the present invention is not limited to only these examples.

A honeycomb structure was manufactured by using the method for manufacturing a honeycomb structure according to the embodiment of the present invention, and the manufactured honeycomb structure was transported: by using the holding apparatus according to the embodiment of the present invention; and by using a holding device that had the same structure as the holding apparatus of the present invention but had no supporting rollers attached thereto, and the appearances of the honeycomb structures after the transporting processes were compared to evaluate damages caused upon holding and transporting the honeycomb structures.

Example 1

250 kg of an α-type silicon carbide powder having an average particle diameter of 10 μm, 100 kg of an α-type silicon carbide powder having an average particle diameter of 0.5 μm and 20 kg of an organic binder (methyl cellulose) were mixed to prepare a powder mixture.

Next, separately, 12 kg of a lubricant (UNILUB, manufactured by NOF Corp.), 5 kg of a plasticizer (glycerin) and 65 kg of water were mixed to prepare a liquid mixture, and this liquid mixture and the powder mixture were mixed by using a wet mixing machine so that a wet mixture was prepared.

Next, this wet mixture was transported to an extrusion-molding machine by using a transporting apparatus, and carried into a material carrying port of the extrusion-molding machine.

Thus, a molded body that has not been sealed having a shape as shown in FIG. 12(a) was manufactured through an extrusion-molding process.

Next, after the above-mentioned molded body had been dried by using a microwave drying apparatus or the like, a sealing material paste having the same composition as the above-mentioned wet mixture was filled into predetermined cells.

Next, after having been dried again by a drying apparatus, a degreasing process was carried out to the molded body at a temperature of 400° C., and fired in a normal-pressure argon atmosphere at a temperature of 2200° C. for 3 hours so that a honeycomb fired body including a silicon carbide sintered body, which had a porosity of 40%, an average pore diameter of 12.5 μm, a size of 34.3 mm×34.3 mm×150 mm, the number of cells (cell concentration) of 46.5 pcs/cm$^2$ and a thickness of each cell wall of 0.20 mm, was manufactured.

By using a heat resistant sealing material paste containing 30% by weight of alumina fibers having an average fiber length of 20 μm, 21% by weight of silicon carbide particles having an average particle diameter of 0.6 μm, 15% by weight of silica sol, 5.6% by weight of carboxymethyl cellulose and 28.4% by weight of water, a number of the honeycomb fired bodies were bonded to one another, and was dried at a temperature of 120° C., and then cut by using a diamond cutter so that a cylindrical shaped ceramic block having a sealing material layer (adhesive layer) of 1.0 mm in thickness was manufactured.

Next, 23.3% by weight of silica-alumina fibers (average fiber length: 100 μm, average fiber diameter: 10 μm) as inorganic fibers, 30.2% by weight of a silicon carbide powder having an average particle diameter of 0.3 μm as inorganic particles, 7% by weight of silica sol (SiO$_2$ content in the sol: 30% by weight) as an inorganic binder, 0.5% by weight of carboxymethyl cellulose as an organic binder, and 39% by weight of water were mixed and kneaded to prepare a sealing material paste.

Next, a sealing material paste layer having a thickness of 0.2 mm was formed on the outer peripheral portion of the honeycomb block by using the above-mentioned sealing material paste. Then, this sealing material paste layer was dried at a temperature of 120° C. so that a cylindrical honeycomb structure having a size of 228 mm in diameter×300 mm in length, with a sealing material layer (coat layer) formed on the outer periphery, was manufactured.

The honeycomb structure thus formed was placed on a mount base tilting from the horizontal plane by 15° with its end face facing down. Next, a holding apparatus in which a transporting robot arm was attached to the base portion 26 of the holding apparatus 20 shown in FIGS. 4(a) and (b) was allowed to approach the honeycomb structure with the longitudinal direction of each of the supporting arm 22a and the supporting arm 24a being kept horizontal. The holding apparatus was moved so that the honeycomb structure was placed between the holding mechanisms 21, so that the first holding unit 22 attached to the supporting arm 22a was made in contact with the side face of the honeycomb structure. Thereafter, the supporting arm 24a was moved toward the supporting arm 22a so that the honeycomb structure was held between the first holding unit 22 and the second holding unit 24, and the honeycomb structure was lifted up and transported to a test board having a horizontal top surface, and placed thereon.

The specifications of the holding apparatus were: 100 mm in distance between the supporting rollers 25a on the supporting arm 22a, 100 mm in distance between the supporting rollers 25b on the supporting arm 24a, and 30 mm in diameter of all the supporting rollers, and an elastic material layer including urethane was formed on the surface of each of supporting rollers. Also, a pressure upon holding the honeycomb structure was 0.5 MPa.

Comparative Example 1

A honeycomb structure was transported in the same manner as Example 1, except that a holding apparatus in which all the first and second holding units were attached to supporting arms 22a, with no supporting rollers included therein, was used as the holding apparatus 20 to hold and transport the honeycomb structure.

(Evaluation on Damaged States of the Honeycomb Structure Caused Upon Transportation or the Like)

With respect to ten honeycomb structures respectively manufactured by Example 1 and Comparative Example 1, and placed on the test board, through the above-mentioned sequence of operations, damaged states on the appearance thereof were examined.

Table 1 shows the results of the examinations.

TABLE 1

|  | No. | damaged states |
|---|---|---|
| Example 1 | 1 | no damage |
|  | 2 | no damage |
|  | 3 | no damage |
|  | 4 | no damage |
|  | 5 | no damage |
|  | 6 | no damage |
|  | 7 | no damage |
|  | 8 | no damage |
|  | 9 | no damage |
|  | 10 | no damage |
| Comparative Example 1 | 1 | no damage |
|  | 2 | no damage |
|  | 3 | chipping on the corner portion |
|  | 4 | no damage |
|  | 5 | no damage |
|  | 6 | no damage |
|  | 7 | crack on the corner portion |
|  | 8 | no damage |
|  | 9 | chipping on the corner portion |
|  | 10 | no damage |

As clearly indicated by Table 1, no damages were caused on the appearance of the honeycomb structure relating to Example 1, and the holding and transporting processes of the honeycomb structures were desirably carried out. In contrast, in Comparative Example 1, with respect to the appearance of the honeycomb structure after the transporting process, three honeycomb structures out of the ten honeycomb structures had damages such as chipping and cracks.

As mentioned above, in the case where the honeycomb structure transporting process in the method for manufacturing a honeycomb structure according to the embodiment of the present invention is carried out by using the holding apparatus according to the embodiment of the present invention, it becomes possible to transport the honeycomb structure efficiently, and also to improve the efficiency of the entire manufacturing processes of the honeycomb structure.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by letters patent of the united states is:

1. A method for manufacturing a honeycomb structure, comprising:
    molding a ceramic material to form a pillar-shaped honeycomb molded body in which a number of cells are disposed substantially in parallel with one another in a longitudinal direction with a cell wall therebetween;
    firing said honeycomb molded body to obtain a honeycomb fired body;
    forming a honeycomb structure including the honeycomb fired body as a constituent unit; and
    inspecting the honeycomb structure,
    wherein said method for manufacturing a honeycomb structure further comprises:
    providing a holding apparatus comprising a first holding unit including at least two supporting rollers rotatable around rotation shafts which extend substantially parallel with each other, a second holding unit including at least one supporting roller rotatable around a rotation shaft, and at least one holding mechanism having said first holding unit and said second holding unit, wherein the rotation shafts of the supporting rollers of said first holding unit and the rotation shaft of the supporting roller of said second holding unit are substantially in parallel with each other, and by moving at least one of said first holding unit and said second holding unit, an object is configured to be held between said first holding unit and said second holding unit by using said supporting rollers;
    holding the honeycomb molded body, the honeycomb fired body, or the honeycomb structure with the holding apparatus by bringing the first holding unit and the second holding unit into contact with the side faces of the honeycomb molded body, the honeycomb fired body, or the honeycomb structure;
    lifting up and transporting the held honeycomb molded body to an apparatus used in the firing step, the held honeycomb fired body to an apparatus used in the forming step, or the held honeycomb structure to an apparatus used in the inspecting step; and
    after transporting, placing the honeycomb molded body, the honeycomb fired body, or the honeycomb structure on a predetermined place with an end face thereof facing down,
    wherein at least one of said first holding unit and said second holding unit has a coupling member that can expand and shrink, with the supporting roller of at least one of said holding units being coupled to said coupling member through the rotation shaft thereof, and
    wherein said holding apparatus further comprises a rotation stopping member that is made in contact with said rotation shaft or said supporting roller to stop the rotation of said supporting roller, in the case where said coupling member is shrunk by a predetermined distance.

2. The method for manufacturing a honeycomb structure according to claim 1,
    wherein said holding apparatus further comprises a first supporting arm to which said first holding unit is attached, and a second supporting arm to which said second holding unit is attached, the method further comprising:
    moving at least one of the first supporting arm and the second supporting arm to hold the object.

3. The method for manufacturing a honeycomb structure according to claim 2,
    wherein the holding apparatus further comprises at least one additional set of the first holding unit and the second holding unit on the first supporting arm and the second supporting arm, the adjacent supporting rollers being provided in substantially parallel with each other.

4. The method for manufacturing a honeycomb structure according to claim 1,
    wherein an elastic layer comprising an elastic material is formed on the surface of said supporting roller.

5. The method for manufacturing a honeycomb structure according to claim 4,
    wherein the elastic material is at least one of synthetic rubber, natural rubber, silicon resin, urethane resin, epoxy resin, and propylene resin.

6. The method for manufacturing a honeycomb structure according to claim 1,
    wherein said holding step includes holding said honeycomb structure,
    and said honeycomb structure has a shape of a cylindrical shape, a cylindroid shape, or a pillar shape with a racetrack end face.

7. The method for manufacturing a honeycomb structure according to claim 1,
    wherein the first holding unit has a coupling member, and the second holding unit has a cut-out portion.

8. The method for manufacturing a honeycomb structure according to claim 1,
    wherein the rotation stopping member is at least one of a block member comprising an elastic material, and a block member comprising resin with an increased frictional resistance on the surface.

9. The method for manufacturing a honeycomb structure according to claim 1, wherein the holding apparatus is coupled to a moving robot arm.

10. A method for manufacturing a honeycomb structure, comprising:
    molding a ceramic material to form a pillar-shaped honeycomb molded body in which a number of cells are disposed substantially in parallel with one another in a longitudinal direction with a cell wall therebetween;
    firing said honeycomb molded body to obtain a honeycomb fired body;
    forming a honeycomb structure including the honeycomb fired body as a constituent unit; and
    inspecting the honeycomb structure,
    wherein said method for manufacturing a honeycomb structure further comprises:
    providing a holding apparatus comprising a first holding unit including at least two supporting rollers rotatable around rotation shafts which extend substantially parallel with each other, a second holding unit including at least one supporting roller rotatable around a rotation shaft and at least one holding mechanism having said first holding unit and said second holding unit, wherein the rotation shafts of the supporting rollers of said first holding unit and the rotation shaft of the supporting roller of said second holding unit are substantially in parallel with each other, and by moving at least one of said first holding unit and said second holding unit, an object is configured to be held between said first holding unit and said second holding unit by using said supporting rollers;

holding the honeycomb molded body, the honeycomb fired body, or the honeycomb structure with the holding apparatus by bringing the first holding unit and the second holding unit into contact with the side faces of the honeycomb molded body, the honeycomb fired body, or the honeycomb structure;

lifting up and transporting the held honeycomb molded body to an apparatus used in the firing step, the held honeycomb fired body to an apparatus used in the forming step, or the held honeycomb structure to an apparatus used in the inspecting step; and after transporting, placing the honeycomb molded body, the honeycomb fired body, or the honeycomb structure on a predetermined place with an end face thereof facing down, wherein said holding apparatus further comprises a first supporting arm to which said first holding unit is attached, and a second supporting arm to which said second holding unit is attached, the method further comprising:

moving at least one of the first supporting arm and the second supporting arm to hold the object, wherein the holding apparatus further comprises, an additional holding unit and an additional supporting roller which are provided at the first or second supporting arm;

a third supporting arm having a third holding unit which includes a supporting roller facing the additional supporting roller and being provided in substantially parallel with the additional supporting roller; and an additional holding mechanism having the additional holding unit and the third holding unit, an additional object is configured to be held between the supporting rollers of the additional holding unit and the third holding unit.

* * * * *